(12) United States Patent
Matthews et al.

(10) Patent No.: US 12,019,606 B1
(45) Date of Patent: *Jun. 25, 2024

(54) HASH OPERATION MANIPULATIONS

(71) Applicant: Innovium, Inc., San Jose, CA (US)

(72) Inventors: William Brad Matthews, San Jose, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 17/061,104

(22) Filed: Oct. 1, 2020

Related U.S. Application Data

(63) Continuation of application No. 15/359,616, filed on Nov. 22, 2016, now Pat. No. 10,795,873.

(51) Int. Cl.
| | | |
|---|---|---|
| *G06F 16/22* | (2019.01) | |
| *G06F 16/23* | (2019.01) | |
| *G06F 16/2455* | (2019.01) | |

(52) U.S. Cl.
CPC ...... *G06F 16/2255* (2019.01); *G06F 16/2379* (2019.01); *G06F 16/2455* (2019.01)

(58) Field of Classification Search
CPC ............ G06F 16/2255; G06F 16/2379; G06F 16/2455
USPC ........................................................ 707/756
See application file for complete search history.

(56) References Cited

U.S. PATENT DOCUMENTS

| | | | |
|---|---|---|---|
| 4,961,139 A | 10/1990 | Hong et al. | |
| 5,251,165 A | 10/1993 | James | |
| 6,345,281 B1 * | 2/2002 | Kardos | G06F 11/1461 700/106 |
| 6,430,562 B1 * | 8/2002 | Kardos | G06F 16/25 705/37 |
| 6,434,662 B1 | 8/2002 | Greene et al. | |

(Continued)

OTHER PUBLICATIONS

United States Patent and Trademark Office, U.S. Appl. No. 15/359,607, Advisory Action dated Jul. 10, 2019.

(Continued)

*Primary Examiner* — Shahid A Alam
(74) *Attorney, Agent, or Firm* — Shield Intellectual Property PC; Kirk D. Wong

(57) ABSTRACT

Certain hash-based operations in network devices and other devices, such as mapping and/or lookup operations, are improved by manipulating a hash key prior to executing a hash function on the hash key and/or by manipulating outputs of a hash function. A device may be configured to manipulate hash keys and/or outputs using manipulation logic based on one or more predefined manipulation values. A similar hash-based operation may be performed by multiple devices within a network of computing devices. Different devices may utilize different predefined manipulation values for their respective implementations of the manipulation logic. For instance, each device may assign itself a random mask value for key transformation logic as part of an initialization process when the device powers up and/or each time the device reboots. In an embodiment, described techniques may increase the entropy of hashing function outputs in certain contexts, thereby increasing the effectiveness of certain hashing functions.

20 Claims, 17 Drawing Sheets

(56) References Cited

U.S. PATENT DOCUMENTS

| | | | |
|---|---|---|---|
| 6,782,475 B1 | 8/2004 | Sumner | |
| 7,274,694 B1 | 9/2007 | Cheng et al. | |
| 7,895,047 B2 * | 2/2011 | Wetzer | G06Q 10/087 |
| | | | 705/305 |
| 8,285,957 B1 | 10/2012 | Giridhar et al. | |
| 8,433,547 B2 * | 4/2013 | Dalgas | G06Q 10/06393 |
| | | | 703/5 |
| 8,874,866 B1 | 10/2014 | Tyson | |
| 9,230,620 B1 | 1/2016 | Lee | |
| 9,716,592 B1 | 7/2017 | Mandal et al. | |
| 10,169,039 B2 | 1/2019 | Moudgill et al. | |
| 2002/0116527 A1 | 8/2002 | Chen et al. | |
| 2003/0135625 A1 | 7/2003 | Fontes et al. | |
| 2006/0248095 A1 | 11/2006 | Cozzani | |
| 2008/0063187 A1 * | 3/2008 | Yoshida | H04L 9/0643 |
| | | | 380/28 |
| 2008/0181103 A1 * | 7/2008 | Davies | H04L 47/10 |
| | | | 370/230 |
| 2009/0085780 A1 | 4/2009 | Vijayrangan | |
| 2009/0100246 A1 | 4/2009 | Uehara | |
| 2009/0177707 A1 * | 7/2009 | Devraj | G06F 16/217 |
| 2009/0222625 A1 | 9/2009 | Ghosh et al. | |
| 2010/0082309 A1 * | 4/2010 | Dawson | G06F 1/206 |
| | | | 703/6 |
| 2011/0013639 A1 | 1/2011 | Matthews et al. | |
| 2011/0099258 A1 * | 4/2011 | Ayachitula | G06F 11/3051 |
| | | | 709/223 |
| 2011/0235508 A1 | 9/2011 | Goel et al. | |
| 2012/0041569 A1 * | 2/2012 | Zhang | G06F 30/13 |
| | | | 703/2 |
| 2012/0117231 A1 * | 5/2012 | Ingle | G06Q 10/00 |
| | | | 709/224 |
| 2012/0136999 A1 | 5/2012 | Roitshtein et al. | |
| 2013/0159039 A1 * | 6/2013 | Brech | G06Q 10/06 |
| | | | 705/7.15 |
| 2013/0173908 A1 | 7/2013 | Matthews et al. | |
| 2013/0347103 A1 | 12/2013 | Veteikis et al. | |
| 2015/0058595 A1 | 2/2015 | Gura et al. | |
| 2015/0120754 A1 | 4/2015 | Chase et al. | |
| 2015/0121035 A1 | 4/2015 | Steele, Jr. et al. | |
| 2015/0127900 A1 | 5/2015 | Dharmapurikar et al. | |
| 2015/0281082 A1 | 10/2015 | Rajahalme | |

OTHER PUBLICATIONS

United States Patent and Trademark Office, U.S. Appl. No. 15/359,607, Final Office Action dated Mar. 7, 2019.

United States Patent and Trademark Office, U.S. Appl. No. 15/359,607, Non-Final Office Action dated Aug. 13, 2018.

United States Patent and Trademark Office, U.S. Appl. No. 15/359,607, Notice of Allowance dated Nov. 14, 2019.

United States Patent and Trademark Office, U.S. Appl. No. 15/359,609, Non-Final Office Action dated Nov. 9, 2018.

United States Patent and Trademark Office, U.S. Appl. No. 15/359,609, Notice of Allowance dated Mar. 8, 2019.

United States Patent and Trademark Office, U.S. Appl. No. 15/359,616, Advisory Action dated Jun. 20, 2019.

United States Patent and Trademark Office, U.S. Appl. No. 15/359,616, Advisory Action dated Apr. 7, 2020.

United States Patent and Trademark Office, U.S. Appl. No. 15/359,616, Final Office Action dated Apr. 18, 2019.

United States Patent and Trademark Office, U.S. Appl. No. 15/359,616, Final Office Action dated Jan. 13, 2020.

United States Patent and Trademark Office, U.S. Appl. No. 15/359,616, Non-Final Office Action dated Oct. 3, 2018.

United States Patent and Trademark Office, U.S. Appl. No. 15/359,616, Non-Final Office Action dated Sep. 9, 2019.

United States Patent and Trademark Office, U.S. Appl. No. 15/359,616, Notice of Allowance dated Jun. 4, 2020.

United States Patent and Trademark Office, U.S. Appl. No. 16/006,073, Notice of Allowance dated Aug. 7, 2019.

* cited by examiner

HASH OPERATION MANIPULATIONS

PRIORITY CLAIM

This application claims benefit under 35 U.S.C. § 120 as a Continuation of application Ser. No. 15/359,616, filed Nov. 22, 2016, the entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

TECHNICAL FIELD

Embodiments relate generally to data lookup operations, and, more specifically, to techniques for improving hash-based lookup operations in network devices or other computer devices.

CROSS-REFERENCE TO RELATED APPLICATIONS

This application is related to U.S. patent application Ser. No. 15/359,607, filed on the Nov. 22, 2016, entitled "Lens Table," by Brad Matthews and Puneet Agarwal, the entire contents of which are hereby incorporated by reference for all purposes as if fully set forth herein. This application is related to U.S. patent application Ser. No. 15/359,609, filed on Nov. 22, 2016, entitled "Lens Distribution," by Brad Matthews and Puneet Agarwal, the entire contents of which are hereby incorporated by reference for all purposes as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A hash function is any function that can be used to map data of potentially arbitrary size to data of fixed size. The mapped data, or a selected portion thereof, is said to be a hash "key." This key is provided as input to the hash function, which then calculates an output value based on the key. The output values returned by a hash function are called hash values, or simply hashes. For a number of applications, the hash function must be deterministic—meaning that for a given input value it must always generate the same hash value. The hash function provides a mapping from one number space (or input value space) to another number space (or output value space) that is typically smaller than input value space A hash value returned from a hash function may be utilized in a variety of computing operations, termed herein as "hash-based operations." For example, a hash table, or hash map, is a data structure used to implement an associative array, which is a structure that maps keys to values. The hash table may be, for example, an array of buckets or slots. A hash function is utilized to compute, for a given key, an index (i.e. the hash value) into the hash table, from which a value associated with that key can be retrieved.

Ideally, the hash function will assign each key to a unique bucket, but it is possible that two keys will generate an identical hash, causing both keys to point to the same bucket. Most hash table designs assume that hash collisions—different keys that are assigned by the hash function to the same bucket—will occur and must be accommodated in some way.

In many situations, hash tables turn out to be more efficient than search trees or any other table lookup structure. For this reason, hash tables are widely used in many kinds of computer software, particularly for associative arrays, database indexing, caches, and sets. For instance, in networking devices, information associated with a network packet may be determined using a hash table. Various portions or fields of the packet are extracted to form a key, and this key is entered into a hash function. The resulting hash value is used to locate an index within the table at which the information associated with the packet is stored. The associated information may include, for example and without limitation, an assigned data flow, selected path, storage address, applicable policy, and/or any other suitable values.

Hash functions serve yet many other purposes within computing devices, such as cryptography operations and data validation operations. Unless otherwise indicated, the techniques described herein may be utilized with respect to hash functions in any suitable computing context.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
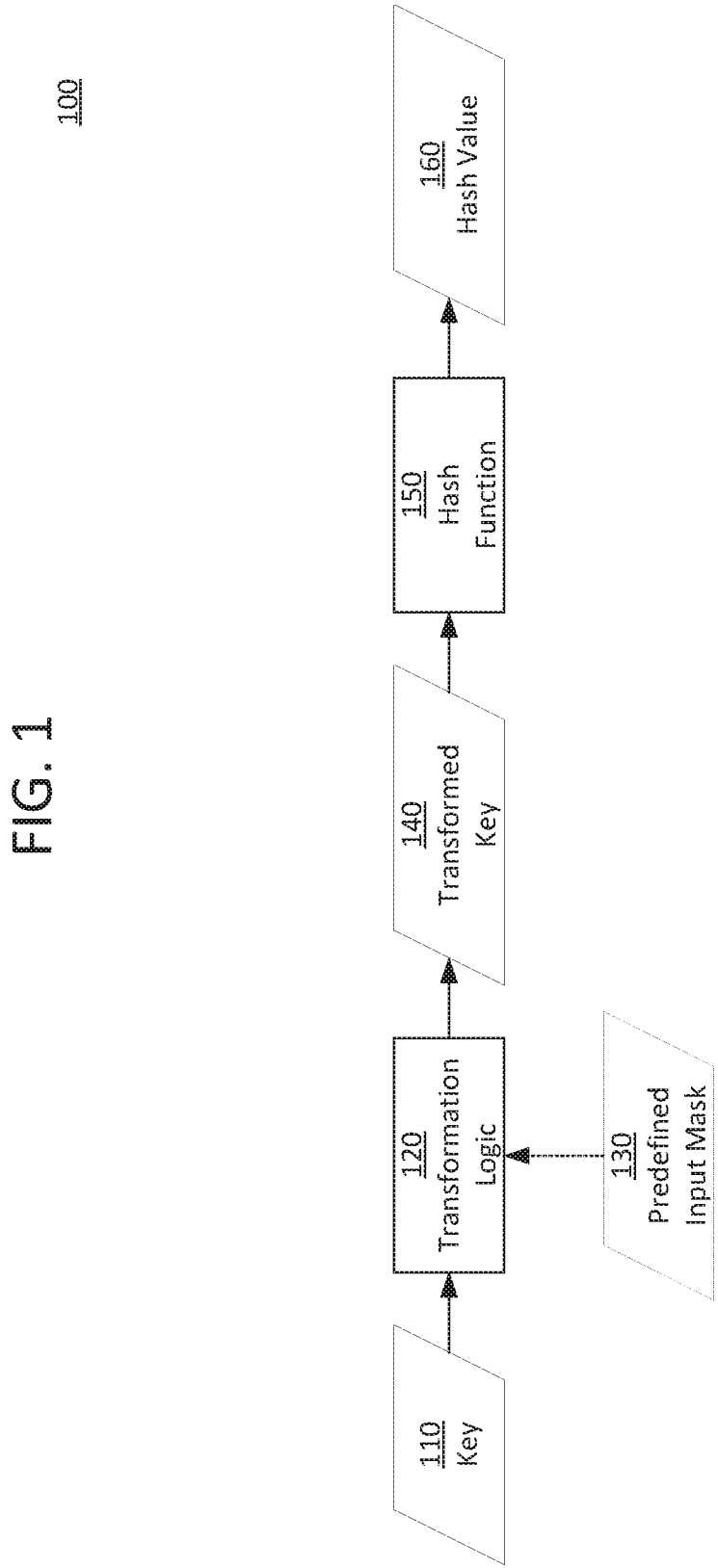
FIG. 1 is an illustrative view of various aspects of an example system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
   2.1. Hash Key
   2.2. Transformation Logic
   2.3. Input Mask Value
   2.4. Hash Function
   2.5. Hash Output Manipulation
   2.6. Hash Key Extension
   2.7. Lookup Component
   2.8. Mapping Component
   2.9. Example Hash Blocks
   2.10. Example Transformation Logic
   2.11. Example Hash Output Manipulation
   2.12. Network Use Case
   2.13. Miscellaneous
3.0. Functional Overview
   3.1. Generating a Hash Value
   3.2. Manipulating the Hash Key
   3.3. Manipulating Hash Output
   3.4. Using Transformed Keys for Lookup Operations in a Network Device
   3.5. Using Hash Manipulations for Mapping Functions
4.0. Example Embodiments
5.0. Implementation Mechanism—Hardware Overview
6.0. Extensions and Alternatives General Overview Approaches, techniques, and mechanisms are disclosed for improving hash-based operations in a network device by manipulating the hash key (also referred to simply as "key") prior to executing the hash function on the hash key and/or by manipulating one or more outputs of a hash function. For example, in some embodiments, rather than executing the hash function on the original key, the hash function is instead executed on a transformed hash key (also referred to herein simply as "transformed key"). As another example, in some embodiments, hash values computed using a hash function are manipulated before being provided to a hash-based operation that is configured to use the hash values. In some embodiments, these manipulations may be implemented by hardware-based logic, such as by a specific sequence of logic gates within a FPGA, ASIC, or other integrated circuit. In other embodiments, the manipulations may be implemented by software-based instructions executed by a general-purpose processor.

In an embodiment, a similar hash-based operation may be performed by multiple devices within a network of computing devices. For example, in a network of switches, each switch may be configured to utilize a hashing function to look up information about or map values to packets that are being processed by the switches. To avoid certain problems that may arise in certain operating contexts if each device always hashed each key to the same value, at least some of the devices may be configured to manipulate keys and/or outputs for the hashing operation in different ways. For instance, each device may be configured to transform keys using transformation logic based on one or more predefined hash manipulation values. Different devices may thus utilize different predefined manipulation values for their respective implementations of the manipulation logic.

For instance, devices may be assigned unique or random hash manipulation values for the manipulation logic when they are manufactured. Or, devices may assign themselves random hash manipulation values for the manipulation logic as part of an initialization process when the devices power up and/or each time the devices reboot. Hash manipulation values may further differ depending on specific characteristics of the hash-based operation for which the hashing is needed (e.g. a specific mapping operation, a specific lookup table upon which a lookup operation is requested, a specific group of data packets being operated upon, etc.). Hence, for example, a device may have a number of registers or other memory structures storing hash manipulation values along with information mapping those hash manipulation values to specific characteristics.

In some embodiments, multiple hash values may be output for a given key. For example, a system may comprise a hash function block configured to perform multiple hashing functions. The same transformed key may be provided to each of the hashing functions. Or, some or all of the hashing functions may be associated with different transformations (e.g. using a different pre-defined mask, using a different series of logical operations, etc.), such that multiple transformed keys are generated. In yet other embodiments, one or more of the hashing functions may utilize the original key instead of a transformed key. In further embodiments, multiple hash values may be generated by submitting combinations of the original key and/or different transformed keys to the same hashing function for processing.

In an embodiment, where multiple hash values are output, various configuration logic may indicate which output(s) to use in which context. In similar manner to that explained above for hash manipulation values, different characteristics of the hash-based operation for which the hash values are being generated may be mapped to different outputs, such that one output may be used to determine one type of value mapped to the key, while another output may be used to determine another type of value mapped to the key. In an embodiment, techniques described herein may be utilized in types of hashing schemes known as "cuckoo hashing." Such schemes involve using multiple different hash functions to compute multiple possible locations in one or more hash tables at which the value associated with a key may be found.

In an embodiment, an example hash key manipulation logic is as follows. The manipulation logic optionally begins with a key extension operation. For example, a number of bits corresponding to a certain predefined hash manipulation value, referred to herein as a key extension value, may be prepended or postpended to the key. The manipulation logic then proceeds to transform the key (or extended key) with a folding exclusive-or ("XOR") operation between each sub-element (e.g. byte) of the key (or extended key) to produce a folded key. A masked addend value is then generated by performing a logical operation such as AND or XOR between the folded key and each sub-element of another predefined hash manipulation value, referred to herein as an input mask value. The masked addend is then fed to an addition function along with the original key (or extended key). The output of the addition function serves as the transformed key, which is then utilized by one or more hash functions to produce one or more hash values. In yet other embodiments, the key manipulation logic may involve other sequences of logic.

In an embodiment, an example hash output manipulation logic for manipulating one or more hash values outputted by one or more hashing functions is as follows. The hash output manipulation logic begins with producing a folded key using a folding exclusive-or ("XOR") operation between each sub-element (e.g. word) of the original key (or extended key) upon which the hash value(s) were generated. A masked addend value is then generated by performing a logical operation such as AND or XOR between the folded key and each sub-element of another predefined hash manipulation value, referred to herein as an output mask value. The output addend is then fed to a modular addition function along with the original hash value(s). The output of the modular addition function serves as the transformed hash output, which is then utilized by one or more hash-based operations to perform various mapping, lookup, or other functions. In yet other embodiments, the hash output manipulation logic may involve other sequences of logic.

The described techniques and mechanisms may provide improved performance in a variety of contexts. For example, many hash-based operations involve hash functions whose input keys may be of relatively low entropy relative to each other. Such may be the case, for instance, in the context of a network device hashing packets to traffic flows. Often, packet fields such as source address, destination address, source port, protocol, and so forth are utilized to form a key. However, since many of the fields will often be limited to only a small set of possible values (e.g. because the same protocol or port predominates the network traffic), the entropy of the keys is relatively limited. Having a low entropy in keys can, with certain hash functions, limit the diversity of outputted hash values. Consequently, the set of hash values actually produced is small relative to the number of possible hash values. This means that, for example, in the context of using hash values as indexes into a lookup table, many indexes of the lookup table will never be used, thus wasting space used to store the lookup table and increasing conflicts at other indexes to which keys are frequently hashed.

The techniques described herein may be utilized to improve the performance of hashing operations in these and other contexts by manipulating the keys in manner to avoid the negative effects of low entropy. Of course, the described techniques and mechanisms may have a variety of other uses in a variety of other embodiments, and need not be limited to embodiments involving hash functions that are less effective with input keys that may be of relatively low entropy relative to each other.

In other aspects, the inventive subject matter encompasses computer apparatuses and computer-readable media configured to carry out the foregoing techniques.

1.0. Structural Overview

FIG. 1 is an illustrative view of various aspects of an example system 100 in which the techniques described herein may be practiced, according to an embodiment. System 100 comprises one or more computing devices. These one or more computing devices comprise any combination of hardware and/or software configured to implement the various logical components described herein, including components 110-160. For example, system 100 may be a network device executing a sequence of logic operations implemented by one or more field-programmable gate arrays ("FPGA"), application-specific integrated circuits ("ASIC"), and/or other specialized circuitry. As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

System 100 illustrates only one of many possible arrangements of components configured to provide the functionality described herein. Other arrangements may include fewer, additional, or different components, and the division of work between the components may vary depending on the arrangement.

System 100 is configured to, among other functions, accept a hash key 110 as input, and generate a hash value 160 based thereon. Although only functionality for generating hash value 160 is described, it will be recognized that system 100 may in fact be configured to provide a variety of other computing functions, some of which may involve using hash values 160 generated for different keys 110 while performing various hash-based operations, and others of which may have no relation to the elements depicted in FIG. 1.

1.1. Hash Key

The hash key 110 may be a value of any length (e.g. 64 bits, other numbers of bits, etc.). The key 110 is formed by or sub-dividable into a set of key elements. For example, the key elements may be a set of bytes, words, or other data units. In some embodiments, each key element is of a same length. In other embodiments, key elements may be of different lengths. In some such embodiments, the transformation logic 120 may nonetheless need to pad each element of the key 110 to a certain number of bits, so as to ensure that certain logical operations may be performed during the transformation of the key 110.

In an embodiment, the key 110 is derived from a specific unit of data for which the hash value 160 is being computed. System 100 may thus further comprise a key generator component (not depicted) configured to generate the key based on the data unit as input. For example, the data unit may comprise a set of fields, and each field in the set of fields may constitute a different key element. Key generation may comprise any suitable steps, ranging from relatively simple trimming or stripping logic that is hard-wired to generate the key by extracting values from specific bits in the data unit (e.g. the first four bytes, a value beginning at bit 5 and ending at 68, etc.), to more complex data parsing logic that interprets, decompresses, and/or decrypts the data unit to identify fields. In some embodiments, fields may furthermore be combined, divided, or processed in other ways to generate key elements.

For instance, the key may be a set of fields in an Internet Protocol ("IP") packet, Ethernet frame, or other datagram. Such fields may include, for example, a source address, destination address, source port, destination port, protocol type identifier, tag, label, or any other suitable information. As yet another non-limiting example, the key elements may be columns of a table row.

A key 110 may be any suitable value used for any suitable purpose, depending on the embodiment. For example, in some embodiments, a key 110 is a value used to lookup another value, or to locate an entry in a table in which to store a value associated with the key 110. Specific examples of such embodiments are described subsequently. In yet other embodiments, the key 110 may have other significance or functions.

1.2. Transformation Logic

System 100 comprises transformation logic 120 configured to input a hash key 110 and output a transformed hash key 140. Generally, the transformation logic 120 increases the diversity of inputs into a hashing operation 150. The transformation logic 120 may do so using any suitable means, including shifting or transposing bits within the key 110 (including between key elements), performing logical or mathematical operations, and so forth.

The transformation logic 120 may be a component taking a variety of forms depending on the embodiment. For example, in an embodiment, the transformation logic 120 may be a series of logic gates configured to perform various logic operations on the key 110, and/or the individual elements thereof, in succession. In some embodiments, the transformation logic 120 is configured to execute quickly (e.g. a handful of clock cycles, or even one clock cycle), so as to minimize the impact of transforming the key 110 on the performance of other functions of system 100 that rely on hash value 160. In other embodiments, the transformation logic 120 need not be as time-efficient, and may involve potentially more complex logic implemented at least in part by a general-purpose processor executing software-based instructions.

Consistency of the Transformation Logic

Over the course of any continual period of normal operation of system 100, the transformation logic must be determinative. That is, during the period, for each hashing operation in a specific context (e.g. for a specific table, set of tables, group of data units, etc.), for any given key 110, the transformation logic 120 must always produce the same transformed key 140, so as to preserve the consistency of any hashing operation 150 that with respect to that key 110 during that period. The transformation logic must thus be configured to always utilize the same strategy to transform a given key 110 during a period. On the other hand, in some embodiments, if normal operation is interrupted (e.g. via a reboot or restart of system 100), transformation logic 120 may use a different strategy to produce a different transformed key 140 for a given key 110 once normal operation resumes, so long as the system 100 no longer considers any data previously computed based on the hashing operation 150 to be valid.

Put another way, system 100 is considered to be in normal operation relative to the hashing function 150 any time it retains in its memory data having some aspect that is dependent on a hash value 160 calculated by hashing function 150 (e.g. a lookup table, data that has been stored in a memory structure whose address is derived from a hash value 160, and so forth). In the event that this memory no longer stores such data (e.g. when the memory is flushed in response to the system losing power or being reset), the system is no longer considered to be in normal operation. Upon resumption of normal operation, the transformation logic 120 may thus begin utilizing a different strategy to transform keys 110.

In an embodiment, choosing a different strategy upon a system reset may be particularly useful in the event that, for example, the current strategy is not producing effective results, as may occur from time to time within certain operating contexts. A system administrator, or automatic administrative logic within the system 100, may detect negative effects of a poorly performing strategy, and reset the unit in the hopes that selecting a new strategy will increase performance of the system 100 in the current operating context.

In some embodiments, the transformed key 140 generated by transformation logic 110 is of the same length as the input key 110. In other embodiments, the transformed key 110 may be bigger or smaller than the input key 110.

1.3. Input Mask Value

In some embodiments, transformation logic 120 may further be based upon a predefined input mask value 130. As its name implies, the mask value 130 is used to "mask" the value of the key 110 one or more times during execution of the transformation logic 120. For example, the transformation logic 120 may perform a logical or mathematical operation between the mask value 130 and the key 110, individual key elements, and/or values derived therefrom. The operation may, for example, a bitwise AND operation, addition, subtraction, multiplication, or any other suitable operation. A more specific example of transformation logic 120 using a mask value 130 is given in subsequent sections.

The mask value 130 may be hard-coded into the system 100, or set in response to various events. In the latter case, the mask value 130 may be stored in a register or any other suitable memory structure. The length of a mask value 130, and the set of possible mask values 130, may vary from embodiment to embodiment. In one embodiment, the mask value 130 is of the same length (e.g. number of bits) as each transformed key 140 and/or key 110. The mask value 130 may be programmable or selected at random from a set of possible mask values. The set of possible mask values 130 may be constrained in some fashion, so as to ensure that certain mask values that have previously been identified as ineffective or undesirable are not selected.

One effect of the mask value 130 is to indicate some aspect of the strategy that is used to transform each key 110. Thus, each different mask value 130 indicates a different strategy to be utilized by the transformation logic 120. Simply by changing the mask value 130, a system 100 may adopt a different strategy for transforming keys 110 into transformed keys 140.

In an embodiment, to preserve the consistency of the hashing operation during normal operation of system 100, the mask value 130 is changed only on occasions that interrupt the normal operation of system 100, such as rebooting or resetting the system 100, or in response to certain types of errors. This is because changing the mask value 130 will change the transformed key 140 generated for a given key 110, and therefore invalidate any previously stored data that was derived from a hash value 160 computed prior to the change. Thus, for example, when the mask value 130 changes, lookup tables indexing keys 110 based on hash values 160 would need to be erased and re-built based on the new mask value 130. The mask value 130 is thus considered to be "pre-defined" for a continuous period of normal operation.

1.4. Hash Function

System 100 further comprises hashing logic 150 configured to accept the transformed key 140 as input, and to output a hash value 160 generated based on a hashing function of that transformed key 140. The hashing operation may involve any suitable hashing function that accepts input values of the same character (e.g. length) as the transformed key 140 and outputs a suitable range of hash values 160 for those input values. The range of possible hash values 160 (i.e. the number of buckets to which a key 110 may hash) may be application specific, to meet the needs of the purpose for which system 100 is utilizing the hash values 160. For example, if each hash value corresponds to a different table index or memory bucket, then the hashing function may be such as to produce a range of hash values at least approximately equal to (and no greater than) the number of available table indexes or memory buckets.

The hashing operation logic 150 may be implemented by a component taking a variety of forms, depending on the embodiment. For example, in an embodiment, the hashing operation may be implemented by a series of logic gates configured to perform various logic operations on the transformed key 140 in succession. In some embodiments, the hashing operation implements a CRC function, such as CRC-32-Ethernet or CRC-64-ISO, a Fowler—Noll—Vo (FNV) function, or other hashing function that can be implemented quickly and/or efficiently in hardware. In other embodiments, the hashing operation need not be particularly quick or efficient, and/or may be implemented by a general-purpose processor executing software-based instructions.

In the case of a CRC function, any suitable polynomial may be utilized. For example, in an embodiment using a CRC-32 Ethernet function, the polynomial may be $x^{32}+x^{26}+X^{23}+X^{22}+X^{16}+X^{12}+X^{11}+X^{10}+X^{8}+X^{7}+X^{5}+X^{4}+X^{2}+X+1$.

By implementing transformation logic 120 prior to the hash function 150, system 100 may potentially increase the diversity of inputs and outputs of the hashing operation 150, in certain contexts. That is, keys 110 may be highly similar and of low entropy in certain contexts (e.g. when the key elements are fields such as IP source addresses in a data center where the addresses are limited to a specific subnet). Because of this, the keys 110 may not be well-distributed throughout the range of possible inputs to the hashing operation 150. This can in turn affect the diversity of hash values 160, particularly in the case of certain hash functions that can be implemented highly efficiently, such as the previously-mentioned CRC operation. However, through transformation logic 120, the keys 110 are transformed into transformed keys 140 that are much more randomly distributed throughout the range of possible input values to the hashing operation 150.

1.5. Hash Output Manipulation

Figure 11:
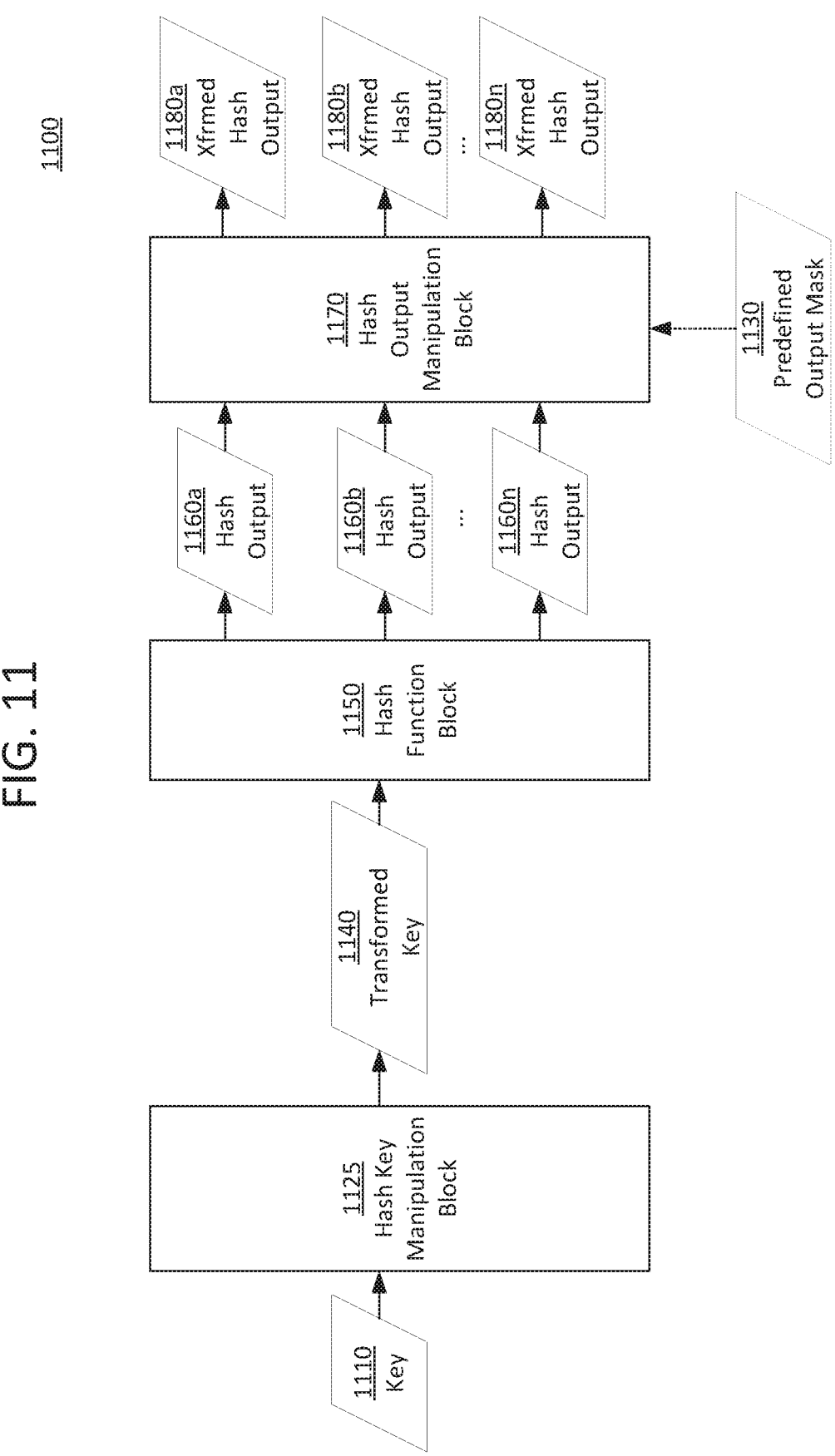
FIG. 11 is an illustrative view of various aspects of an example system in which hash output manipulation techniques described herein may be practiced.

FIG. 11 is an illustrative view of various aspects of an example system 1100 in which hash output manipulation techniques described herein may be practiced, according to an embodiment. System 1100 comprises one or more computing devices. These one or more computing devices comprise any combination of hardware and/or software configured to implement the various logical components described herein, including components 110-160. For example, system 1100 may be a network device executing a sequence of logic operations implemented by one or more field-programmable gate arrays ("FPGA"), application-specific integrated circuits ("ASIC"), and/or other specialized circuitry. As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

System 1100 is configured to, among other functions, accept a hash key 1110 as input, and generate transformed hash output values 1180 based thereon. Although only functionality for generating hash values 1180 is described, it will be recognized that system 1100 may in fact be configured to provide a variety of other computing functions, some of which may involve using transformed hash output values 1180 generated for different keys 1110 while performing various hash-based operations, as well as other functions of which may have no relation to the elements depicted in FIG. 11.

System 1100 comprises a hash key manipulation block 1125 configured to accept a key 1110 as input and output a transformed key 1140 based thereon. Key 1110 may be, for example, similar to key 110. The hash key manipulation bock 1125 may manipulate the key 1110 in a variety of manners. For example, the hash key manipulation bock 1125 may add, prepend, or append, an extension value to the key 1110. As another example, the hash key manipulation bock 1125 may comprise transformation logic such as that described with respect to transformation logic 1120.

System 1100 further comprises a hash function block 1150. Hash function block 1150 accepts the transformed key 1140 as input, calculates hash values based on the transformed key 1140, and outputs those hash values as hash outputs 1160 (shown as hash outputs 1160a-n). Each hash output 1160 may be calculated using a different hash function in hash function block 1150. For example, hash function block 1150 may comprise a CRC-16-CCITT Ethernet function, a CRC-32C function, and a CRC-64-ISO function. In an embodiment, each hash output 1160 is output in parallel. In an embodiment, hash function block 1150 may be implemented directly by special purpose hardware configured to perform the hashing functions.

The hash outputs 1160 are input into the hash output manipulation block 1170, which generates and outputs transformed hash outputs 1180 (shown as transformed outputs 1180a-n) based upon the inputted hash outputs 1160. Some or all of the transformed hash outputs 1180 may then be fed as input to a hash-based operation (e.g. a lookup operation or mapping operation, not depicted).

The hash output manipulation block 1170 may transform hash outputs 1160 using any suitable means, including shifting or transposing bits within the hash outputs 1160, performing logical or mathematical operations, and so forth. The hash output manipulation block 1170 may, in some embodiments, transform the hash outputs 1160 using the same manipulation logic. In other embodiments, the hash output manipulation block 1170 may use different manipulation logic for each hash output 1160.

In an embodiment, the hash output manipulation block 1170 may transform hash outputs 1160 using a predefined output mask value 1130. As its name implies, the mask value 1130 is used to "mask" the value of the hash output 1160 one or more times during execution of the hash output manipulation block 1170. For example, the hash output manipulation block 1170 may perform a logical or mathematical operation between the mask value 1130 and the hash outputs 1160, key 1110, and/or values derived therefrom. The operation may, for example, include a bitwise AND operation, addition, subtraction, multiplication, or any other suitable operation. A more specific example of hash output manipulation block 1170 using a mask value 1130 is given in subsequent sections. Note that predefined output mask value 1130 may have similar characteristics as predefined input mask value 130, but need not be the same value (or even size or length).

In an embodiment, the same consistency rules that apply to transformation logic 120 also apply to hash output manipulation block 1170. Thus, for instance, if a predefined output mask value 1130 is used for a specific hashing context, the predefined output mask value 1130 for that context may only change (if at all) when there is a break in the normal operation of system 1100, such as a system restart. Like the predefined input mask value 130, the predefined output mask value 1130 may be assigned randomly or pseudo-randomly at such times. In yet other embodiments, the predefined output mask value is encoded in hardware and thus incapable of changing. In either case, different devices may be configured with a different predefined output mask value 1130, and/or different predefined output mask values 1130 may be used for different hash-based operations within the same device.

In an embodiment, hash outputs 1160 are concatenated together, and then subject to an operation such as modular addition with another addend value before being separated again into separate transformed outputs 1180. The addend value may be a predefined output mask value. Or, the addend value may be computed based on a predefined mask value 1130 and some other value, such as the transformed key 1140, key 1110, or an extended key. Other example hash output manipulations are described elsewhere herein.

The hash output manipulation block 1170 may be a component taking a variety of forms depending on the embodiment. For example, in an embodiment, the hash output manipulation block 1170 may be a series of logic gates configured to perform various logic operations on the hash outputs 1160 in succession. In some embodiments, the hash output manipulation block 1170 is configured to execute quickly (e.g. a handful of clock cycles, or even one clock cycle), so as to minimize the impact of transforming the hash outputs 1160 on the performance of other functions of system 1100 that rely on transformed hash values 1180. In other embodiments, the manipulation logic 1170 need not be as time-efficient, and may involve potentially more complex logic implemented at least in part by a general-purpose processor executing software-based instructions.

System 1100 illustrates only one of many possible arrangements of components configured to provide the functionality described herein. Other arrangements may include fewer, additional, or different components, and the division of work between the components may vary depending on the arrangement. For example, in an embodiment, hash key manipulation block 1125 may be omitted, and the hash function block 1150 is configured to accept the key 1110 directly. As another example, hash function block 1150 may produce any number of hash outputs 1160, including just one, two, or any other number, and thus hash output manipulation block 1170 may produce the same number of transformed hash outputs 1180.

As yet another example, hash output manipulation block 1170 may be configured to deliver fewer transformed hash outputs 1180 than the hash outputs 1160 produced by hash function block 1150, or even just one transformed hash output 1180. For instance, hash output manipulation block 1170 may be configured to select between hash outputs 1160 based on configuration data for or additional input from a specific hash-based operation which is requesting the transformed hash outputs 1180.

1.6. Hash Key Extension

In some embodiments, hash key transformation logic, such as transformation logic 120, may be replaced or subsumed by a hash key manipulation block, which includes other operations to manipulate the hash key instead of or in addition to those of the transformation logic. Such a hash key manipulation block may include, for example, hash key extension logic configured to append or prepend a value to the hash key.

Figure 13:
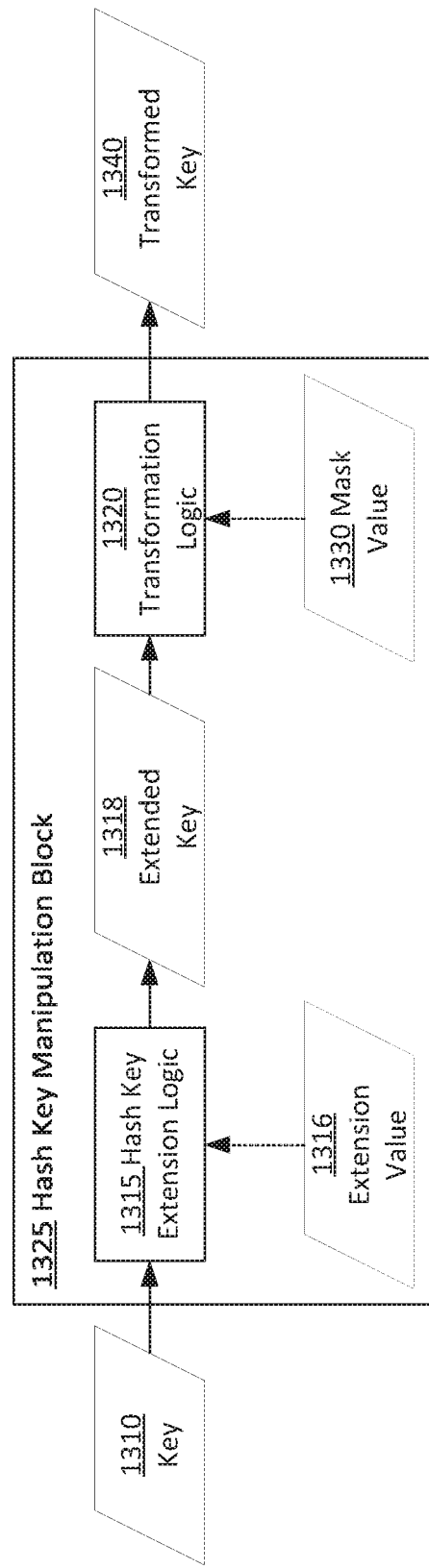
FIG. 13 illustrates a system comprising a hash key manipulation block.

For example, FIG. 13 illustrates a system 1300 comprising a hash key manipulation block 1325, according to an embodiment. Hash key manipulation block 1325 may, for example, be used in place of transformation logic 120. Hash key manipulation block 1325 is further an example of hash key manipulation block 1125.

Hash key manipulation block 1325 accepts a key 1310, such as key 110, as input. Hash key manipulation block 1325 comprises various components configured to manipulate the inputted key 1310, including hash key extension logic 1315. Hash key extension logic 1315 extends the key 1310 in some manner to produce an extended key 1318 of a target size. For example, hash key extension logic 1315 may prepend or append the key 1310 with a certain number of bits, whose values are indicated by an extension value 1316. For example, if the key 1315 is ninety bits in length, and the extended value 1318 is intended to be ninety-six bits, the extension value 1316 may be a set of six bits that are placed before or after those of the key 1310. As another example, the extension value 1316 may be added to the key 1310.

As with transformation logic 120, the manner by which the extension logic 1315 extends the key 1310 should be consistent over a specific context throughout normal operation of the device. Hence, if extension value 1316 is used in a specific context, the extension value 1316 should be fixed for that context throughout any continuous period of normal operation. However, if the extension value 1316 is not encoded in hardware, the extension value may be randomly assigned when the device reboots or restarts, as described with respect to the input mask value. Moreover, different devices may be configured with different extension values, and/or different extension values may be used for different hash-based operations within the same device.

The extended key 1328 is then inputted into transformation logic 1320, such as described with respect to transformation logic 120. An input mask value 1330, of the same nature as mask value 130, may be utilized by transformation logic 1320 to transform the extended key 1318 into a transformed key 1340, which can then be used as input into any suitable hashing function.

System 1300 illustrates only one of many possible arrangements of components configured to manipulate a hash key. Other arrangements may include fewer, additional, or different components, and the division of work between the components may vary depending on the arrangement.

1.7. Lookup Component

Figure 2:
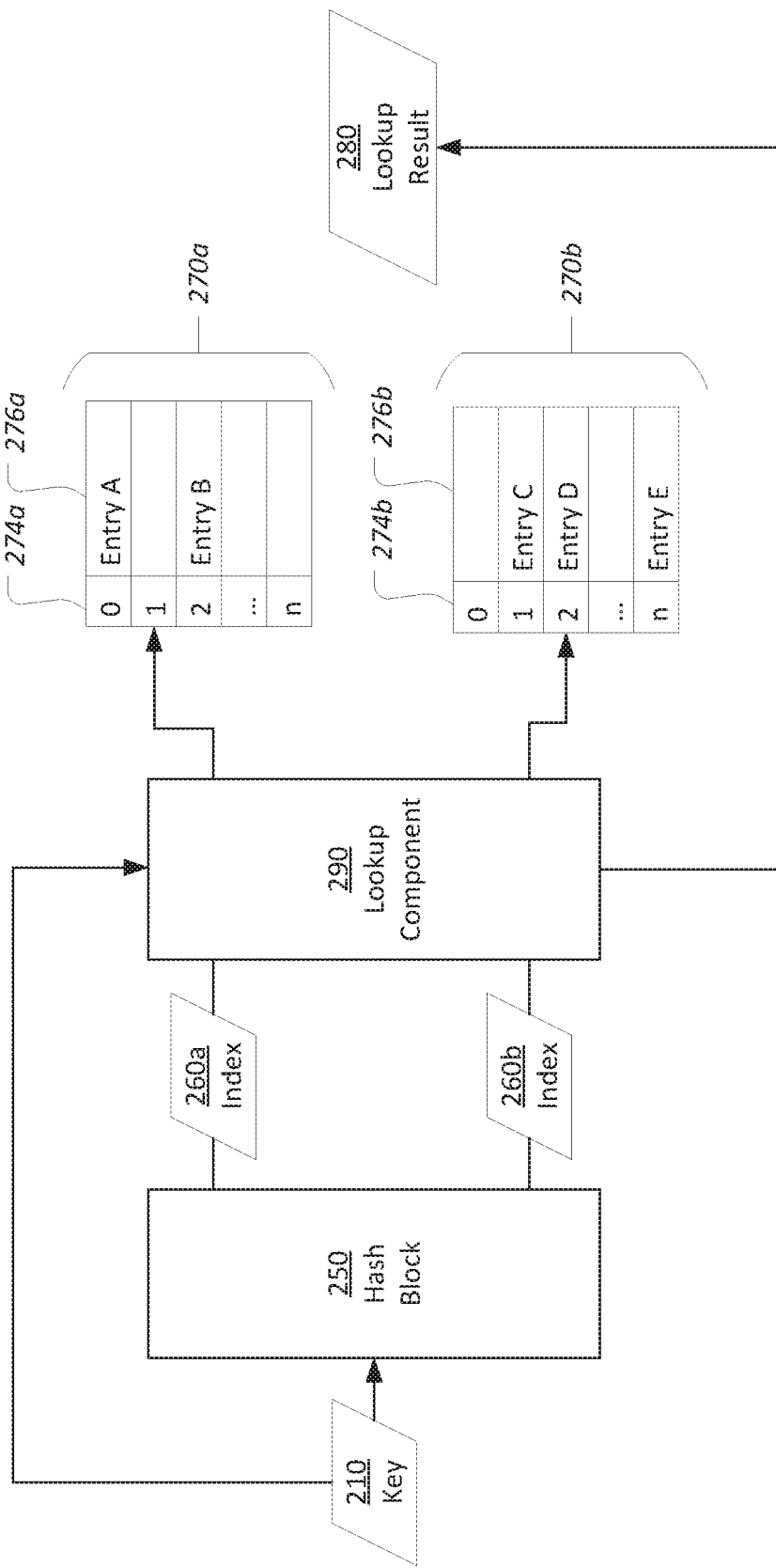
FIG. 2 is an illustrative view of various aspects of an example system in which hash values may be utilized as indexes in lookup operations.

FIG. 2 is an illustrative view of various aspects of an example system 200 in which hash values, such as those generated using techniques described above, may be utilized as indexes 260 in lookup operations, according to an embodiment. System 200 comprises one or more computing devices. These one or more computing devices comprise any combination of hardware and/or software configured to implement the various logical components described herein, including components 250-290. For example, system 200 may be a network device executing a sequence of logic operations implemented by one or more field-programmable gate arrays ("FPGA"), application-specific integrated circuits ("ASIC"), and/or other specialized circuitry. As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, the components of systems 100 and/or 1100 may be utilized together with system 200, and thus systems 100 and/or 1100 may be part of a same system as system 200. More specifically, in implementing a lookup operation, system 200 illustrates one of the many possible applications of the hash values 160 generated by the components of system 100 or transformed hash values 1180 generated by the components of system 1100. However, systems 100 and 1100 need not necessarily be utilized only in conjunction with system 200. Note that system 200 illustrates only one of many possible arrangements of components configured to provide the lookup functionality described herein. Other arrangements may include fewer, additional, or different components, and the division of work between the components may vary depending on the arrangement.

System 200 comprises a lookup component 290 configured to, among other aspects, search for keys 210 at indexes 260 within one or more tables 270. Though the term "table" is used for convenience, the term table as used herein should more generally be understood to be any data structure representing an associative array that associates buckets with indexes. A table 270 comprises a plurality of buckets 276, each associated with a different index number 274. Certain buckets 276 are empty, in that they do not (yet) store any data. Each of the non-empty buckets 276 stores an entry specifying an association between a different key 210 and its corresponding lookup value. The lookup value may be any value that is stored in association with the key, such as a memory address, a path label, a priority indicator, or any other suitable value. In some embodiments, no lookup value is stored, but rather the mere existence of the key in a bucket 276 signifies an implicit lookup value.

To perform a lookup operation, lookup component 290 is configured to receive a search key 210 as input. The search key 210 may be, for example, a key 110 or 1110. The search key 210 is also sent to a hash block 250. The hash block 250 is configured to identify one or more indexes (e.g. the depicted indexes 260a and 260b) for the search key 210. The indexes 260 represent locations within the one or more tables 270 in which the key 210 may be stored. The hash block 250 computes these indexes 260 using a variety of techniques. For example, at least one of the indexes may be a hash value 160 or a transformed hash value 1180, or a remainder when such a hash value 160 or a transformed hash value 1180 is divided by the total number n of buckets 276 that are found in the table 270.

Each index 260 should be computed using a different technique (e.g. different transformed hash key, different hash function, different output manipulation, etc.). Though two indexes 260 are shown, the number of outputs of the hash block 250 that are computed and/or utilized depends on the embodiment. Example hash blocks 250 are described subsequently.

The lookup component 290 locates the index 274 that corresponds to a given input index 260, and determines whether the bucket 276 stored at that index 274 includes the search key 210. If so, the lookup component outputs a lookup result 280 that includes the lookup value that the bucket associates with that search key 210.

Where more than one index 260 is inputted into the lookup operation 290, each index 260 represents an alternate index. If the search key 210 is not found at one index 260, the lookup component 290 is configured to search the other alternate index(es) 260, in turn, until the search key is found 210, or until all indexes 260 have been searched. This strategy of searching more than one index is an aspect of a scheme referred to as "cuckoo" hashing. In the depicted embodiment, there are separate tables 270a and 270b for each of the generated indexes 260a and 260b, referred to as a left table and right table, respectively. The tables 270a and 270b have their own separate indexes 274a and 274b with corresponding buckets 276a and 276b, respectively. Index 260a is used to locate the corresponding index 274a in table 270a, while index 260b is used to locate the corresponding index 274b in table 270b. Although two tables 270 are depicted, there may be any number of tables 270. For example, in some embodiments, there may be three, four, or even more tables 270. In other embodiments, there may be only one table 270, and indexes 260a and 260b are both used to locate indexes 274 within that one table 270.

In some embodiments, only one association is stored in a bucket 276. In other embodiments, to increase flexibility in cases where multiple keys 210 hash to the same index 260, a bucket 276 may be a data structure capable of storing associations for more than one key 210. Such a bucket 276 is said to store multiple entries, each corresponding to a different association. The lookup component 290 compares the search key 210 to each association stored in the bucket 276, and, if found the search key 210 is found in the associations, returns the lookup value for the association whose key matches the search key 210. The maximum number of entries stored per bucket 276 may be limited to some number (e.g. four, two, etc.), which may be chosen based on factors such as the character of the hash block 270 used to calculate indexes 260, memory constraints, and so forth. The number of entries to store per bucket 276 is generally chosen in such a way as to balance the cost of memory allocated to store those entries versus the performance gained from having more available entries.

Although system 200 specifically illustrates a lookup operation involving two alternate indexes 260, it will be apparent that the techniques scale to any number of alternate indexes 260, and may furthermore involve any number of tables 270. Moreover, in embodiments where cuckoo hashing is not implemented, system 200 may instead be implemented using a single index 260 produced by a hash block comprising a single hash function, and using a single table 270, without searching for alternate indexes.

In an embodiment, a system 200 may comprise many lookup components 290, each operating on their own respective tables. In another embodiment, lookup component 290 may be general-purpose, in that it searches a different set of one or more tables depending on a table set or type of value for which the lookup operation is being requested. Hence, a lookup component 290 would search a first set of tables 270 for a lookup operation to locate an assigned data flow, and a second (and different) set of tables 270 for a lookup operation to locate an assigned queue. The lookup component 290 may further be configured to provide input into the hash block 250 that indicates, for instance, a number of buckets to hash to, or other characteristics of the hashing operation or transformation logic to be performed by the hash block 250, since different types of tables 270 may have different characteristics.

In an embodiment, a pre-defined input mask value to use in the hash block may be stored in configuration data associated with the set of tables that is being searched by the key. Hence, the hash block may be configured to read or receive the mask value from different configuration data, depending on the target of the lookup operation for which a hash function is being utilized.

Inserting Entries to the Lookup Table

In some embodiments, lookup component 290 or another component within system 200 may further be configured to write a key 210 and its associated data to tables 270. Subsequently, when the same key 210 is received (e.g. because a new data unit that is being processed has the same key 210), the entry storing the key 210 may be located and the associated data returned (e.g. for processing the new data unit). For instance, when a new key 210 is received, a component of system 200 may be configured to insert its corresponding value to one of tables 270 at an index 260 calculated by hash block 250, which index 260 is effectively the hash value or hash output of the hash block 250. Or, if no bucket 276 at any of the computed indexes 260 contains a search key 210 for which a lookup operation is requested, the search key 210 may be added to a bucket 276 at one of the corresponding indexes 274.

A specific index 274 at which to insert the search key 210 may be determined using a variety of techniques. For instance, if the bucket 276 associated with index 260a is already filled with the maximum number of associations, and the bucket 276 associated with index 260b is not filled, index 260b may be chosen (and vice versa). The search key 210 may be inserted at a specific one of the indexes 260 by default, unless the corresponding bucket 276 is already filled. For instance, index 260a may be considered a primary index 260 to which the search key 210 should be written by default, while index 260b is considered a secondary index 260. One write policy may be to attempt to write a key 210 that is currently not found at the primary or secondary index to the primary index 260 first, and to the secondary index 260 if the primary index 260 is full. However, another policy may be to attempt to write the key 210 to the secondary index first. Yet another policy would be to attempt to insert the key 210 to a randomly selected one of the primary index 260 and secondary index 260 first, and to the other second. Such policies are easily extended to three, four, or even more tables 270.

If a lookup value is to be stored with the key 210, the component updating the lookup table may be configured to receive or even request this value. For example, in the case of a write operation, the write operation may specify both the key 210 and its lookup value. As another example, where the lookup value is a memory address, an available address may be requested from a memory allocation system prior to adding the key 210 to a lookup table 270. The memory address may then be returned as part of the operation.

If none of the buckets 276 associated with the calculated indexes 260 have available space in which to store the key 210, the component writing the search key 270 may be configured to move or delete an association already stored within those buckets 276, in certain embodiments. Because the cuckoo hashing scheme yields at least two different locations in which a given key may be stored, as long as the set of tables 270 associated with the lookup operation are suitably sized, room may generally be made available to store most keys 210 whose assigned locations are full by moving existing keys (potentially recursively) to other locations in which the cuckoo hashing scheme permits them to be stored. Both the keys and their associated data are moved. On the other hand, in some embodiments, such movement may introduce undesirable overhead, and the system 200 may simply be configured in at least some circumstances to delete an existing key to make room for a new key when needed, as opposed to moving the existing key. Or, system 200 may simply drop the new key without writing the new key to a table 270.

For instance, if a first key hashes to an index A and an index B, but index A contains a second key and index B contains a third key (and system is limited to one key per bucket), then the system may choose to move or delete the second key or third key. The specific key chosen for movement or deletion may depend on a variety of factors, such as which key is stored at the primary index for the first key, which key is oldest, or any other suitable factor. If the chosen key is to be moved rather than deleted, then the chosen key is resubmitted to the lookup operation. The chosen key may hash, in turn, to an index A (or B) and an index C. The chosen key may thus be moved to index C. If index C is also unavailable, then, depending on the embodiment, the key that was not initially chosen for movement may be moved instead, the chosen key may simply be deleted, or the key that is stored at index C may be moved or deleted to make room for the chosen key. In the latter case, this movement may be repeated over multiple iterations until an index has been found to store each key. Or, certain constraints may be imposed on the number of movements before a key insertion attempt is determined to have failed. The failed key may be the first key, or a key that was chosen for movement, depending on the embodiment. In an embodiment, the key that is being inserted is generally the key that is determined to have failed, and is thus not inserted.

The foregoing techniques extend to embodiments where multiple keys may be stored per bucket, in which case keys need only be moved if the maximum number of keys have been stored in each bucket to which a key can be added or moved.

1.8. Mapping Component

Figure 12:
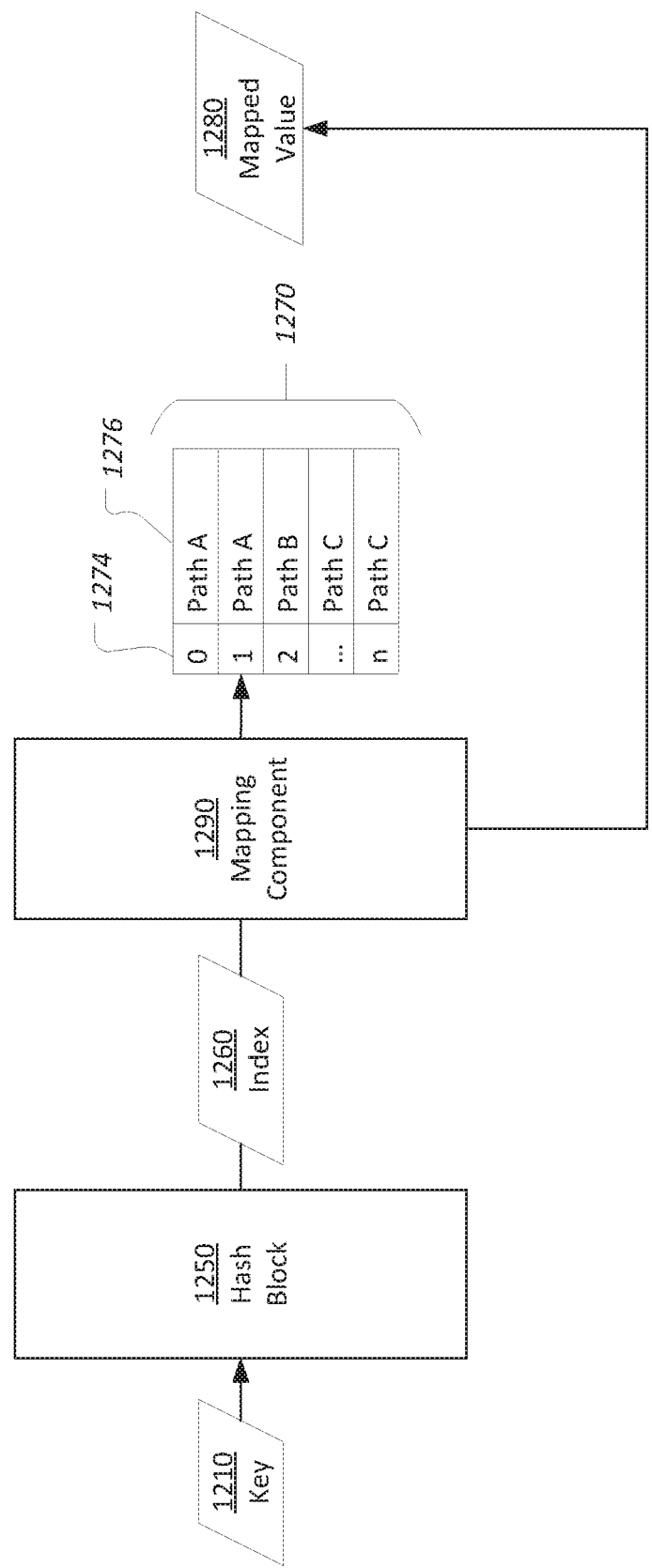
FIG. 12 is an illustrative view of various aspects of an example system in which hash values may be utilized as indexes in mapping operations.

FIG. 12 is an illustrative view of various aspects of an example system 1200 in which hash values, such as those generated using techniques described above, may be utilized as indexes 1260 in mapping operations, according to an embodiment. System 1200 comprises one or more computing devices. These one or more computing devices comprise any combination of hardware and/or software configured to implement the various logical components described herein, including components 1250-1290. For example, system 1200 may be a network device executing a sequence of logic operations implemented by one or more field-programmable gate arrays ("FPGA"), application-specific integrated circuits ("ASIC"), and/or other specialized circuitry. As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, the components of systems 100 and/or 1100 may be utilized together with system 1200, and thus systems 100 and/or 1100 may be part of a same system as system 1200. More specifically, in implementing a mapping operation, system 1200 illustrates one of the many possible applications of the hash values 160 generated by the components of system 100 or transformed hash values 1180 generated by the components of system 1100. However, systems 100 and 1100 need not necessarily be utilized only in conjunction with system 1200. Note that system 1200 illustrates only one of many possible arrangements of components configured to provide the lookup functionality described herein. Other arrangements may include fewer, additional, or different components, and the division of work between the components may vary depending on the arrangement.

System 1200 comprises a mapping component 1290 configured to, among other aspects, find values 1276 that are mapped to keys 1210 at indexes 1260 within a table 1270. Table 1270 comprises a plurality of values 1276, each associated with a different index number 1274.

To perform a mapping operation, mapping component 290 is configured to receive a search key 1210 as input. The search key 1210 may be, for example, a key 110 or 1110. The search key 1210 is also sent to a hash block 1250.

The hash block 250 is configured to identify at least one index 1260 for the search key 1210. The index 1260 represents a location within the table 1270 at which the value mapped to the key 1210 is stored. The hash block 1250 computes the index 1260 using a variety of techniques. For example, the index 1260 may be a hash value 160 or a transformed hash value 1180, or a remainder when such a hash value 160 or a transformed hash value 1180 is divided by the total number n of entries found in the table 1270.

In embodiments where the hash block 1250 produces more than one output, such as in system 1100 where three different transformed hash outputs 1180 are generated, the mapping component 1290 may be configured to select which output to input as the index 1260 based on configuration data associated with the mapping component 1290 and/or the table 1270.

The mapping component 1290 locates the index 1274 that corresponds to a given input index 1260, and returns the value 1276 stored at that index 1274 as the mapped value 1280. Although an embodiment that relies upon a table data structure is depicted, it will be understood that in other embodiments, the data structure may take other forms, such as a list associating sets or ranges of indexes 1274 with specific values 1276.

Weighted Cost Multipathing Example

The mapped value 1276 may have a variety of significances, depending on the embodiment. For example, in an embodiment, the table 1270 may be a Weighted Cost Multipath (WCMP) table or similar structure for determining a path over which to send a network packet to a specific destination. In general, WCMP involves assigning a weight to each possible path for a destination (the destination being either a single destination node or a group of nodes such as a subnet). The technique used to map paths to network packets (via their respective keys 1210) utilizes these weights to ensure that the probability of a packet being assigned to a given path is approximately proportional to the weight of that path relative to the weights of the other paths to the destination. For instance, a path with a weight of two might be selected twice for every time a path with a weight of one is selected. Each possible path is assigned a number of entries within the table 1270, in proportion with its weight, and each value 1276 thus represents a path. The network packet is then sent along a path corresponding to the mapped value 1280 returned by the mapping component 1290.

Since a network device may be capable of sending packets to many destinations, the device may have many different WCMP tables 1270. The mapping component 1290 may further be configured to determine in which table 1270 to look for the mapping based upon input data indicating the destination of the packet whose key 1210 is being submitted. In an embodiment, this table 1270 may store its own configuration data that indicates various aspects of the operations to be performed by hash block 1250. For example, the configuration data for a table 1270 may indicate which mask values and/or extension value to utilize for the hash block 1250 when looking for the mapping stored in the table 1270. As another example, the configuration data may indicate which transformed hash output 1180 to accept as the index 1260. In another embodiment, such configuration data is specified on a per-group or per-flow basis, independently of a WCMP table 1270.

In an embodiment, a portion of the hash output is used to perform a lookup into a group table (e.g. WCMP group table) which provides the (a) number of members in the group and (b) base address into a member table. Then, a second lookup is performed into a member table using the index=group base address+(hash output mod number of group members).

Of course, WCMP is but one example mapping operation. Other operations may map data packets to other types of values, or map yet other types of data units to other types of values. Other non-limiting examples include link aggregation, trunking, or other aggregation operations in a network device.

1.9. Example Hash Blocks

As used herein, the term hash block, such as hash block 250, is any collection of components that accepts a key as input and generates one or more hash values (or transformed hash values) as outputs. According to an embodiment, a simple example of a hash block is the combination of components 120-150 of system 100. Another example of a hash block is the combination of components 1125 through 1170 of FIG. 11. A hash block may be utilized to support any suitable hash-based operation. More complicated examples of hash blocks, featuring more than one output, are also described herein. Such hash blocks may also support any suitable hash-based operations, such as lookup operations based on cuckoo hashing. In such hash-based operations, some or all of the outputs of the hash block may be utilized for the hash-based operation.

In an embodiment, the same hash block hardware may be re-used for any number of different hash-based operations within the same device, such as for different lookup operations (e.g. a lookup operation for a data flow versus a lookup operation for a cache entry). Where the hash block that generates multiple outputs is utilized for multiple hash-based operations, configuration data associated with the hash-based operation may indicate which of the outputs to utilize, the number of buckets to hash to, and so forth. For example, where the hash block is utilized for multiple different lookup operations, the lookup tables specific to a given lookup operation may include a configuration block that indicates which of the different outputs to utilize for the lookup operation.

Figure 3:
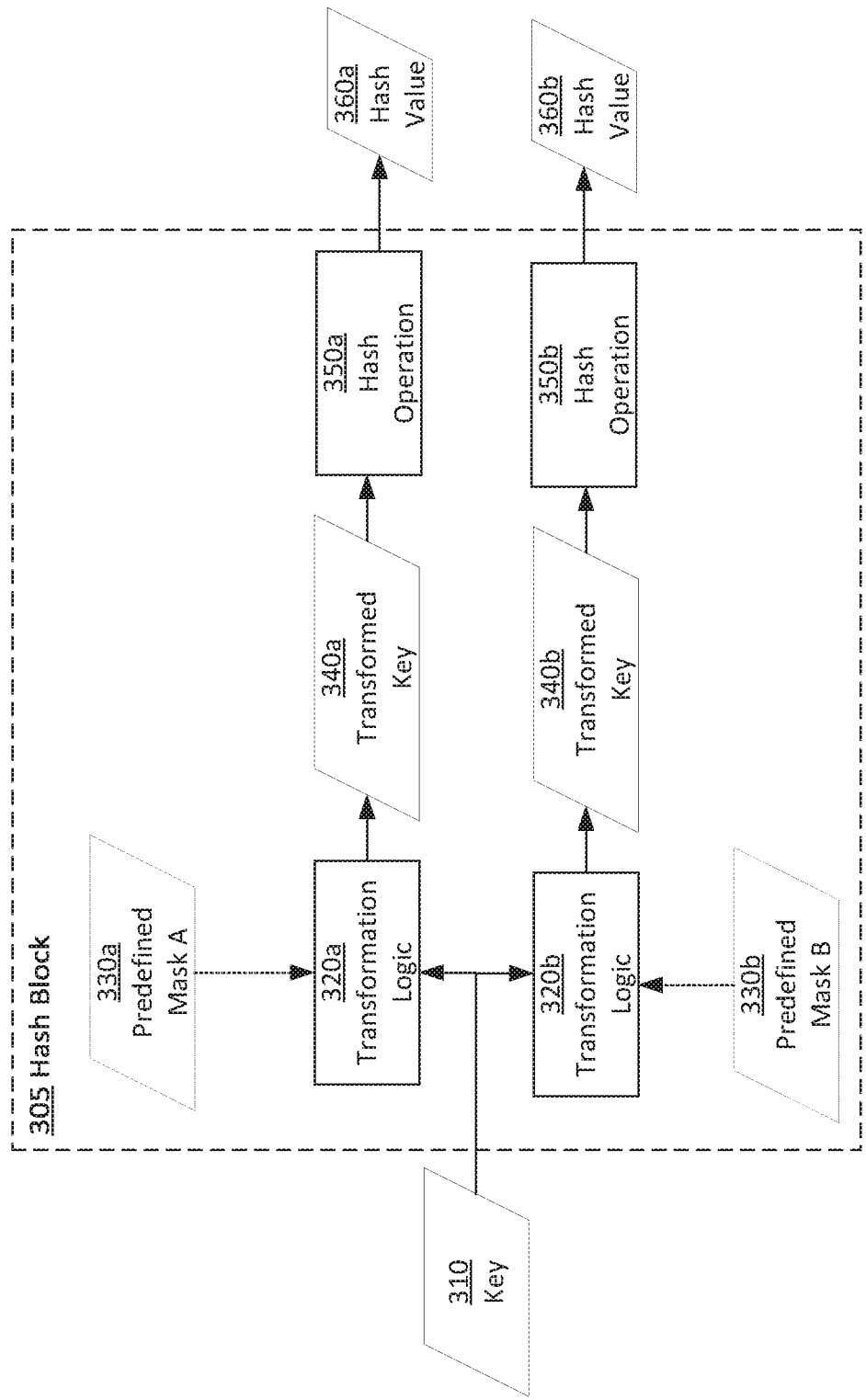
FIG. 3 is an illustrative view of various aspects of an example system in which a hash block generates multiple hash values for a single key using dual transformed keys.
Figure 4:
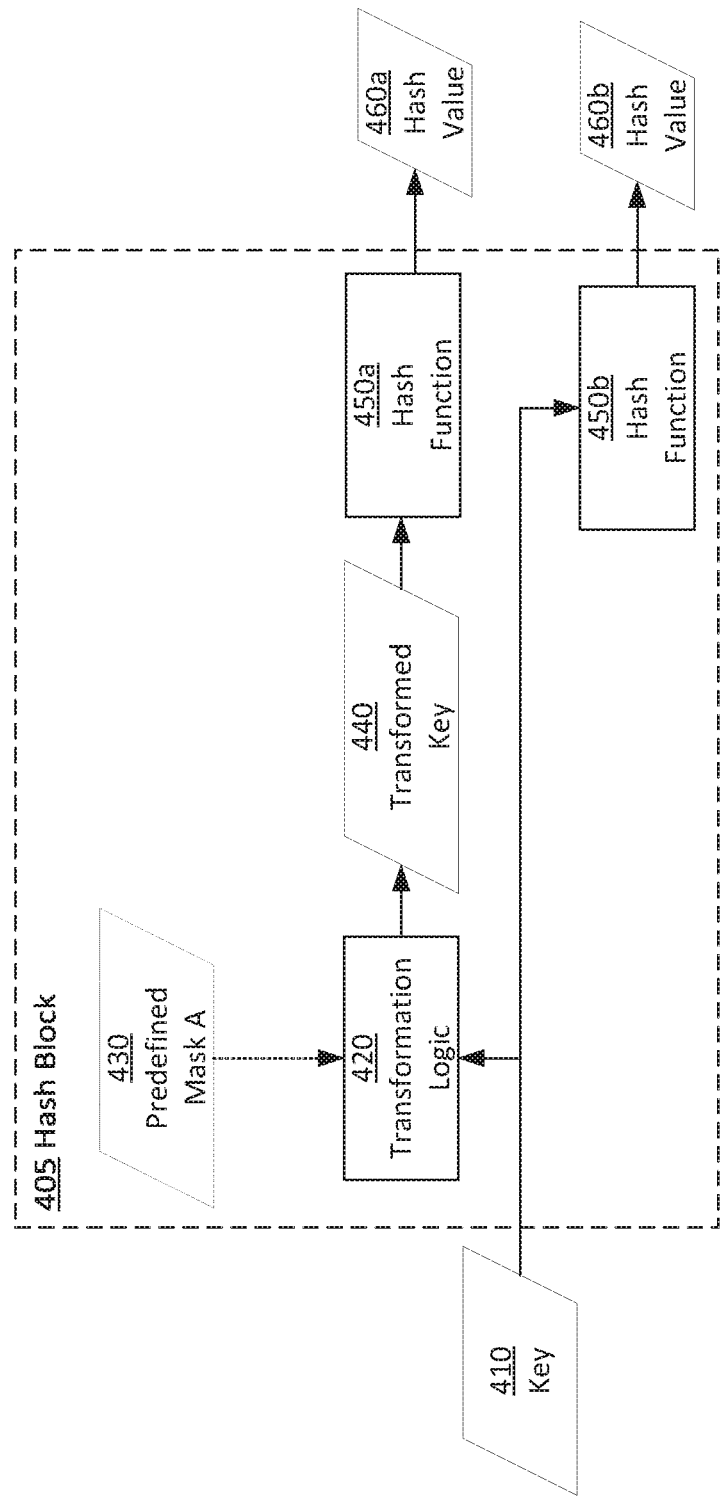
FIG. 4 is an illustrative view of various aspects of an example system in which a hash block generates multiple hash values for a single key using both the original key and a transformed key.
Figure 5:
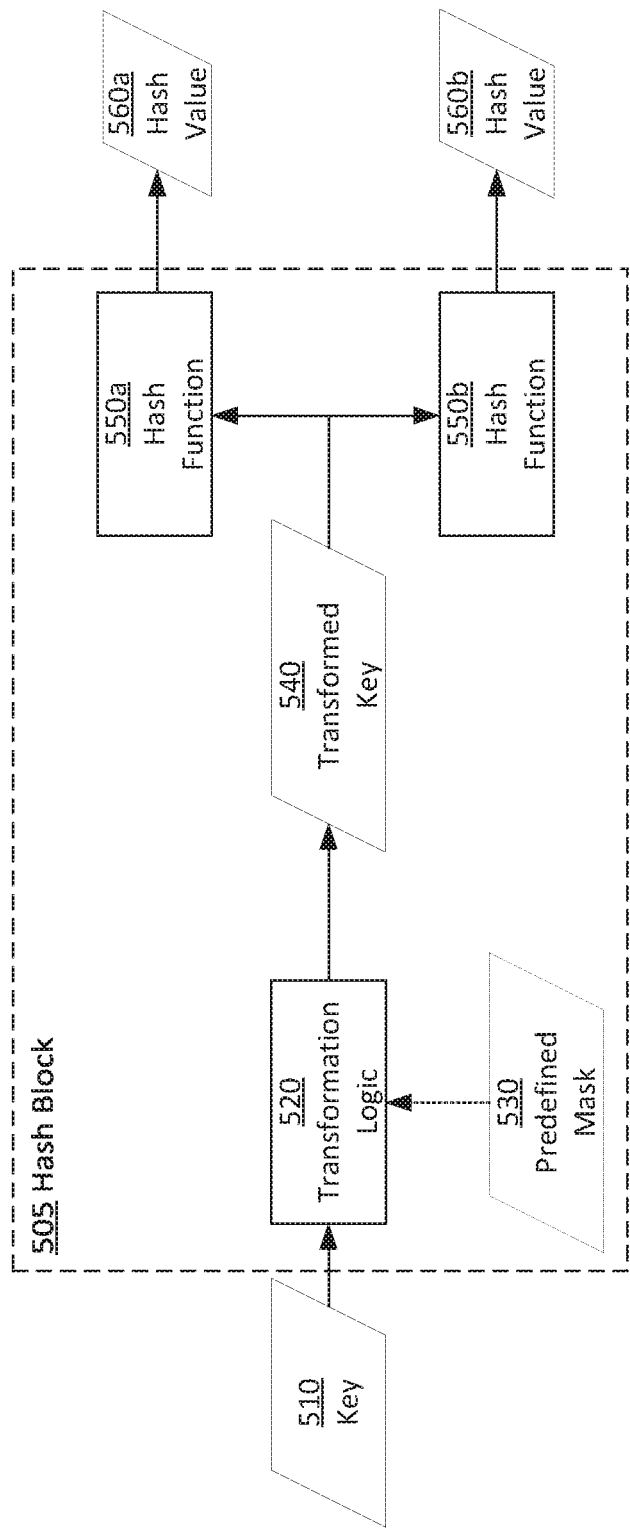
FIG. 5 is an illustrative view of various aspects of an example system in which a hash block generates multiple hash values for a single key using a single transformed key processed by multiple hashing operations.

FIGS. 3-5 illustrate various aspects of example systems 300, 400, and 500 in which multiple hash values are generated for a single key, according to embodiments. System 300, 400, and 500 comprises one or more computing devices. These one or more computing devices comprise any combination of hardware and/or software configured to implement the various logical components described herein. For example, systems 300, 400, and 500 may be implemented by one or more field-programmable gate arrays ("FPGA"), application-specific integrated circuits ("ASIC"), and/or other specialized circuitry. As another example, systems 300, 400, and 500 may be implemented using components that include one or more memories storing instructions for implementing the various components described herein, one or more hardware processors configured to execute the instructions stored in the one or more memories, and various data repositories in the one or more memories for storing data structures utilized and manipulated by the various components.

In various embodiments, the components of systems 300, 400, or 500 may be utilized together with the components of other systems described herein, and thus systems 300, 400, or 500 may be part of a same system as those systems. However, in other embodiments, each of systems 300, 400, and 500 may be utilized separately from other systems described herein.

Multiple Transformed Keys

FIG. 3 is an illustrative view of various aspects of an example system 300 in which a hash block 305 generates multiple hash values 360 for a single key 310 using multiple transformed keys 340, according to an embodiment. In some embodiments, the hash block 305 of system 300 may be utilized as the hash block 250 of system 200, with key 310 corresponding to key 210, and hash values 360a and 360b corresponding to indexes 260a and 260b, respectively. In other embodiments, hash block 305 may generate multiple hash values 360 for purposes other than lookup operations, and need not be limited to use in conjunction with system 200 or even system 100.

A hash key 310, such as key 110 or search key 210, is provided to the hash block 305. More specifically, the key 310 is inputted into both transformation logic 320a and transformation logic 320b. Each of transformation logic 320a and 320b are components configured to transform the key 310 using techniques such as described elsewhere herein. For instance, each of transformation logic 320a and 320b may be instances of transformation logic 120. However, each of transformation logic 320a and 320b is configured to transform the key 310 in a different manner, thereby producing different transformed keys 340a and 340b, respectively. For instance, in embodiments where both of transformation logic 320a and 320b rely upon a mask value 330, such as mask value 130, the mask value 330a input into transformation logic 320a may be different than the mask value 330b input into transformation logic 320b.

The transformed keys 340a and 340b are then input into hash functions 350a and 350b, respectively. Hash functions 350a and 350b are configured to output hash values 360a and 360b, respectively, which are generated based on applying hashing functions to the respectively inputted transformed keys 340a and 340b. The hash functions 350a and 350b may be, for example, separate instances of hash function 150. The hash functions 350a and 350b may both utilize different hash functions, or they may utilize a same hash function, in which case the hash functions 350a and 350b may in some embodiments actually be implemented by a same component that is configured to process transformed keys 340a and 340b separately. The hash values 360 generated are generally of the same character as hash value 160, described previously.

Although only two transformed keys 340 are depicted, in yet other embodiments, there may be three or even more transformed keys 340 used to calculate different hash values 360.

Concurrent Use of Key and Transformed Key

FIG. 4 is an illustrative view of various aspects of an example system 400 in which a hash block 405 generates multiple hash values 460 for a single key 410 using both the original key 410 and a transformed key 440, according to an embodiment. In some embodiments, the hash block 405 of system 400 may be utilized as the hash block 250 of system 200, with key 410 corresponding to key 210, and hash values 460a and 460b corresponding to indexes 260a and 260b, respectively. In other embodiments, hash block 405 may generate multiple hash values 460 for purposes other than lookup operations, and need not be limited to use in conjunction with system 200 or even system 100.

A hash key 410, such as key 110 or search key 210, is provided to the hash block 405. More specifically, the key 410 is inputted into both transformation logic 420 and a hash function 450b. Transformation logic 420 is a component configured to transform the key 410 into a transformed key 440 using techniques such as described elsewhere herein. For instance, transformation logic 420 may be an instance of transformation logic 120. Optionally, transformation logic 420 may be based on a predefined mask value 430, such as described with respect to mask value 130. The transformed key 440 is input into hash function 450a.

Hash functions 450a and 450b are configured to output hash values 460a and 460b, respectively, which are generated based on applying hashing functions to the inputted transformed key 440 and key 410, respectively. The hash functions 450a and 450b may be, for example, separate instances of hash function 150. The hash functions 450a and 450b may both utilize different hash functions, or they may utilize a same hash function, in which case the hash functions 450a and 450b may in some embodiments actually be implemented by a same component that is configured to process transformed key 440 and key 410 separately. The hash values 460 generated are generally of the same character as hash value 160, described previously.

According to an embodiment, a hash block may comprise the components of hash block 405, wherein the transformed key 440 and key 410 are both submitted to each of hash functions 450a and 450b, and wherein hash functions 450a and 450b implement different hashing function. Hence, a total of four different hash values are generated. For instance, suppose hash function 450a implements a CRC-32C hash function and hash function 450b implements a CRC-32 Ethernet hash function. In such an embodiment, outputs would be generated for the original key with the CRC-32C hash function, the original key with the CRC-32C Ethernet hash function, the transformed key with the CRC-32C hash function, and the transformed original key with the CRC-32C Ethernet hash function. In embodiments where the hash values may be utilized as indexes in lookup tables, each output may be utilized as an index. Or, where the hash block is utilized for multiple different lookup operations, the lookup tables specific to a given lookup operation may include a configuration block that indicates which of the different outputs to utilize for the lookup operation. Another variation on the foregoing may involve generating different transformed keys 440 using different mask values 430 for each hash function.

Single Transformed Key with Multiple Hashing Operations

FIG. 5 is an illustrative view of various aspects of an example system 500 in which a hash block 505 generates multiple hash values 560 for a single key 510 using a single transformed key processed by multiple hashing operations 550, according to an embodiment. In some embodiments, the hash block 505 of system 500 may be utilized as the hash block 250 of system 200, with key 510 corresponding to key 210, and hash values 560a and 560b corresponding to indexes 260a and 260b, respectively. In other embodiments, hash block 505 may generate multiple hash values 560 for purposes other than lookup operations, and need not be limited to use in conjunction with system 200 or even system 100.

A hash key 510, such as key 110 or search key 210, is provided to the hash block 505. More specifically, the key 510 is inputted into transformation logic 520. Transformation logic 520 is a component configured to transform the key 510 into a transformed key 540 using techniques such as described elsewhere herein. For instance, transformation logic 520 may be an instance of transformation logic 120. Optionally, transformation logic 520 may be based on a predefined mask value 530, such as described with respect to mask value 130.

The transformed key 540 is then input into hash functions 550a and 550b, respectively. Hash functions 550a and 550b are configured to output hash values 560a and 560b, respectively, which are generated based on applying hashing functions to the transformed keys 540. The hash functions 550a and 550b may be, for example, separate instances of hash function 150. The hash functions 550a and 550b utilize different hash functions. The hash values 360 generated are generally of the same character as hash value 160, described previously.

Note that systems 300, 400, and 500 illustrate only some of many possible arrangements of components configured to implement a hash block. Other arrangements may include fewer, additional, or different components, and the division of work between the components may vary depending on the arrangement. Moreover, other embodiments may involve more than two hash functions and/or transformed keys. As yet another non-limiting example, a hash block may generate three (or more) different outputs from a same hash function using the original key along with multiple different transformed keys as input.

In some embodiments, each of the example hash blocks described above may be modified to include a hash key extension block immediately before each transformation logic, or as the key is inputted into the hash block. In some embodiments, each of the example hash blocks described above may be modified to include a hash output manipulation block, such as hash output manipulation block 1470, prior to the final output of the hash block.

1.10. Example Transformation Logic

Figure 6:
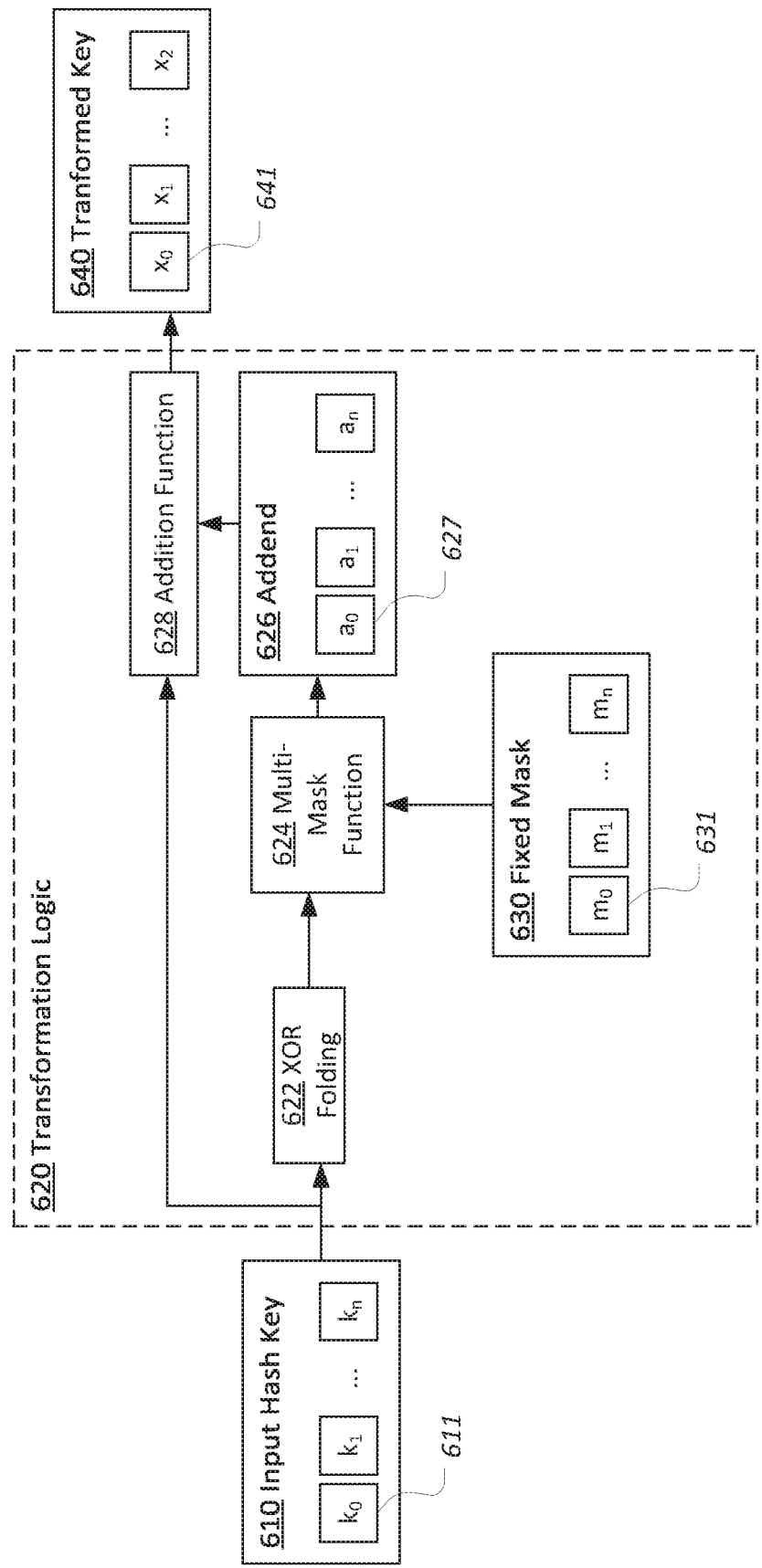
FIG. 6 illustrates an example transformation logic implemented within a system.

FIG. 6 illustrates an example transformation logic 620 implemented within a system 600, according to an embodiment. The example transformation logic 620 is one example of the transformation logic described elsewhere in this disclosure, including transformation logic 120, 320, 420, and 520. The transformation logic 620 may involve, for instance, executing a sequence of logic operations implemented by one or more field-programmable gate arrays ("FPGA"), application-specific integrated circuits ("ASIC"), and/or other specialized circuitry. As another example, the transformation logic may be implemented using one or more memories storing instructions for implementing the various components described herein, one or more hardware processors configured to execute the instructions stored in the one or more memories, and various data repositories in the one or more memories for storing data structures utilized and manipulated by the various components.

A hash key 610 is input into transformation logic 620. The hash key may be an original key, such as key 110, or an extended key, such as key 1318. The hash key 610 comprises a set of key elements 611, labeled $k_0$ through $k_n$. In an embodiment, each key element 611 is a single byte. In other embodiments, the elements 611 of key 610 may take any other suitable form, as discussed with respect to key 110.

The transformation logic folds these key elements 611 together into a folded key using an XOR-folding operation 622. The XOR-folding operation 622 involves performing XOR operations between each key element 611. A suitable XOR-folding operation 622 is described as follows: $k_0$ XOR $k_1$ XOR $k_2$ XOR . . . $k_n$. Note that the "folded" value produced by operation 622 is a single value of the same length as the longest individual key element. Thus, for example, if each key element 611 is eight bits, then the result of operation 622 is a single eight-bit value.

For example, a first XOR operation may be performed between element $k_0$ and element $k_1$. A second XOR operation may be performed between the result of this first XOR operation and element $k_1$. A third XOR operation may be performed between the result of this second XOR operation and element $k_2$. This process may be repeated until an XOR operation has been performed with each key element 611, with each subsequent XOR operation performed on the result of the previous XOR operation. Of course, those skilled in the art will recognize that there are a variety of arrangements of logic gates capable of producing a suitably similar folded result.

The folded key is then inputted into a multi-mask function 624. The multi-mask function 624 further inputs a fixed mask value 630, such as the pre-defined mask value 130. The fixed mask value 630 is sub-dividable into a set of mask elements 631, labeled $m_0$ through $m_n$. The number of mask elements 631 is the same as the number of key elements 611, and each mask element 631 is of the same length as a corresponding key element 611. For instance, in an embodiment where each key element 611 is a byte, each mask element 631 would also be a byte.

The multi-mask function 624 involves producing a temporary addend value 626 comprising a set of addend elements 627, labeled $a_0$ through $a_n$. The number of addend elements 627 is the same as the number of key elements 611 and mask elements 631, and each addend element 627 is of the same length as a corresponding mask element 631. For instance, in an embodiment where each key element 611 is a byte, each addend element 627 would also be a byte.

The multi-mask function 624 produces the addend value 626 by, for each mask element 631, performing a logical operation between the mask element 631 and the folded key to produce a corresponding one of the addend elements 627. The logical operation may be, for instance, an AND operation or XOR operation. For example, if the chosen logical operation is AND, the multi-mask function 624 is described as follows: $a_i = XOR_{result}$ & $m_i$, where i is the order of the element in the corresponding set and $XOR_{result}$ is the folded key. Thus, for instance, an AND operation between $m_0$ and the folded key would produce $a_0$.

The addend value 626 is then input into addition function 628, along with the original key 610. The addition function 628 performs an addition operation between the key 610 and the addend value 626 to produce a transformed key 640. In an embodiment, transformed key 640 may be sub-dividable into a set of elements 641, labeled $x_0$ through $x_n$. The number of transformed key elements 641 is the same as the number of key elements 611 and mask elements 631, and each transformed key element 627 is of the same length as a corresponding mask element 631

In an embodiment, instead of simply adding addend 626 and input hash key 610, addition may be performed between the individual elements of the addend 626 and key 610. That is, $x_i=a_i+k_i$. In such an embodiment, the addition of any addend element and key element may be such that the operation does not impact any other addition operations. For example, if $k_1+a_1$ carries over a 1, the 1 would simply be dropped rather than added to the next element (e.g. $k_2+a_2$). Other rules may also be imposed, such as a requirement that the result not saturate, and a requirement that the addition operation must simply roll over. In an embodiment where each element 641 is a byte, the addition operation is a bytewise addition operation.

For example, consider a key of two bytes, $k_0$ and $k_1$, set to 0xFE and 0xFD, respectively. Suppose that $a_0$ and $a_1$ are 0x03 and 0x06, respectively. After a bytewise addition operation subject to all of the above constraints, $x_1=a_1+k_1=0xFE+0x03=0x02$, while $x_1=a_1+k_1=0xFD+0x06=0x03$. Hence, the key 0xFEFD is transformed to 0x0203.

System 600 illustrates only one of many possible arrangements of components configured to transform a hash key 610 into a transformed key 640. Other arrangements may include fewer, additional, or different components, and the division of work between the components may vary depending on the arrangement.

1.11. Example Hash Output Manipulation

Figure 14:
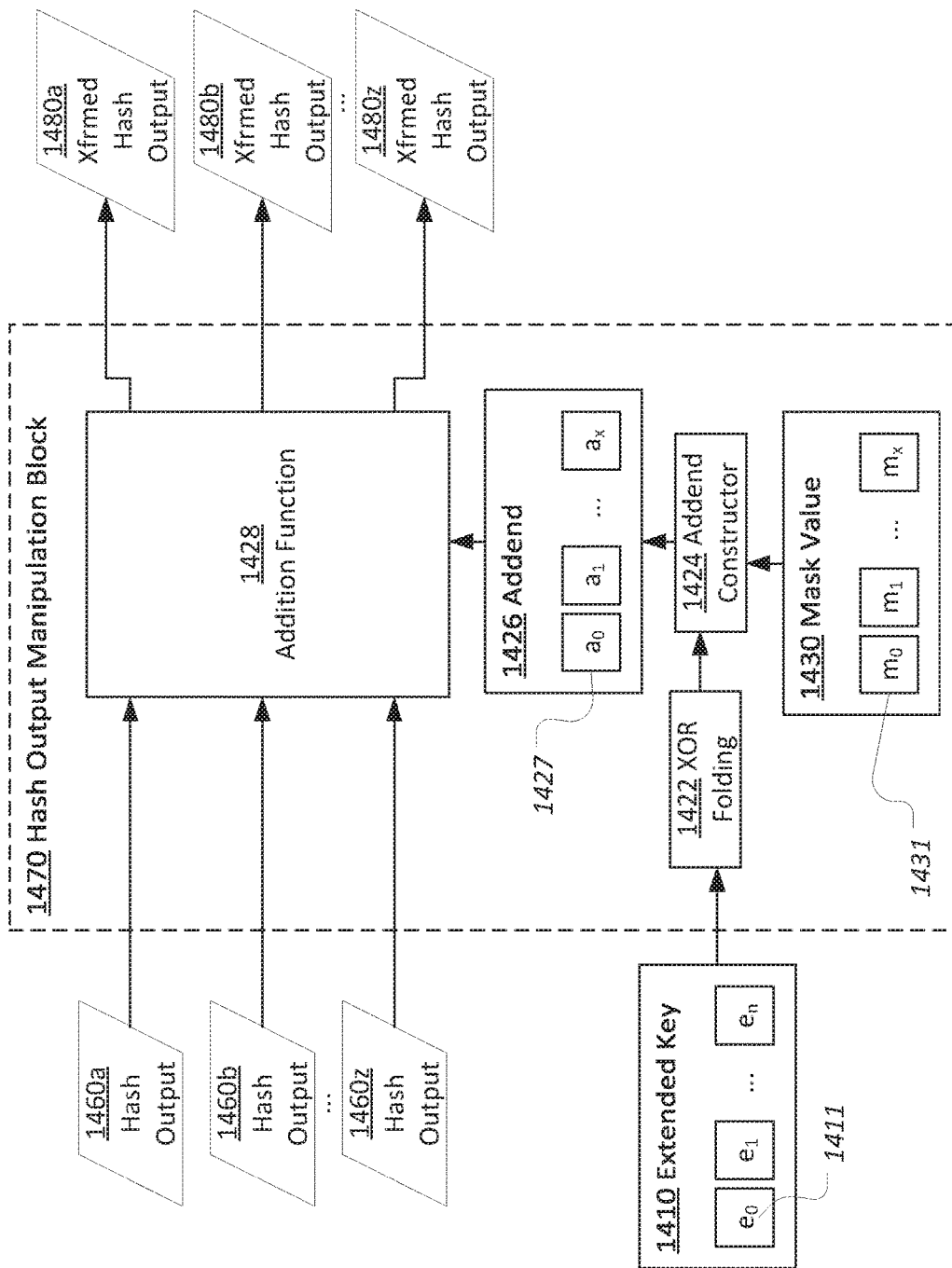
FIG. 14 illustrates an example hash output manipulation block.

FIG. 14 illustrates an example hash output manipulation block 1470 implemented within a system 1400, according to an embodiment. The example hash output manipulation block 1470 is one example of the hash output manipulation logic described elsewhere in this disclosure, including hash output manipulation block 1170. The hash output manipulation block 1470 may involve, for instance, executing a sequence of logic operations implemented by one or more field-programmable gate arrays ("FPGA"), application-specific integrated circuits ("ASIC"), and/or other specialized circuitry. As another example, the hash output manipulation block may be implemented using one or more memories storing instructions for implementing the various components described herein, one or more hardware processors configured to execute the instructions stored in the one or more memories, and various data repositories in the one or more memories for storing data structures utilized and manipulated by the various components.

A hash key 1410 is inputted into the hash output manipulation block 1470. Hash key 1410 may be an original key, such as key 110, or an extended key, such as extended key 1318. The hash key 1410 comprises, or is sub dividable into, portions referred to herein as a set of key elements 1411, labeled $e_0$ through $e_n$. In an embodiment, each key element 1411 is a word (i.e. a unit of sixteen bits). In other embodiments, the elements 1411 of key 1410 may take any other suitable form. Note that, where system 1400 also comprises transformation logic such as transformation logic 620, elements 611 and elements 1411 may or may not be the same. For instance, a key 1410 that is subdivided into byte-size elements for transformation upon input may be subdivided into larger (e.g. word) sized elements 1411 for hash output manipulation block 1470.

The transformation logic folds these key elements 1411 together into a folded key using an XOR-folding operation 1422. The XOR-folding operation 1422 involves performing XOR operations between each key element 1411. A suitable XOR-folding operation 1422 is described as follows: $e_0$ XOR $e_1$ XOR $e_2$ XOR . . . $e_n$. Note that the "folded" value produced by operation 1422 is a single value of the same length as the longest individual key element 1411. Thus, for example, if each key element 1411 is sixteen bits, then the result of operation 1422 is a single sixteen-bit value.

For example, a first XOR operation may be performed between element $e_0$ and element $e_1$. A second XOR operation may be performed between the result of this first XOR operation and element $e_1$. A third XOR operation may be performed between the result of this second XOR operation and element $e_2$. This process may be repeated until an XOR operation has been performed with each key element 1411, with each subsequent XOR operation performed on the result of the previous XOR operation. Of course, those skilled in the art will recognize that there are a variety of arrangements of logic gates capable of producing a suitably similar folded result.

The folded key is then inputted into an addend constructor 1424. The addend constructor 1424 further inputs a fixed output mask value 1430, such as mask value 1130. The fixed mask value 1430 is sub-dividable into a set of mask elements 1431, labeled $m_0$ through $m_x$. Each mask element 1431 is of the same length as a corresponding key element 1411. For instance, in an embodiment where each key element 1411 is a word, each mask element 1431 would also be a word. However, the number x of mask elements 1431 need not be the same as the number n of key elements 1411. In fact, in an embodiment, the number x of mask elements 1431 is a function of the number and size of hash outputs 1460 rather than of key elements 1411.

The addend constructor 1424 involves producing a temporary addend value 1426 comprising a set of addend elements 1427, labeled $a_0$ through $a_x$. The number x of addend elements 1427 is the same as the number of mask elements 631, and each addend element 1427 is of the same length as a corresponding mask element 1431. For instance, in an embodiment where each mask element 1431 is a word, each addend element 1427 would also be a word.

The addend constructor 1424 produces the addend value 1426 by, for each mask element 1431, performing a logical operation between the mask element 1431 and the folded key to produce a corresponding one of the addend elements 1427. The logical operation may be, for instance, an AND operation or XOR operation. For example, if the chosen logical operation is AND, the addend constructor 1424 may be described as follows: $a_i=XOR_{result}$ & where i is the order of the element in the corresponding set and $XOR_{result}$ is the folded key. Thus, for instance, an AND operation between $m_0$ and the folded key would produce $a_0$. Or, as another example, the addend constructor may be $a_i=XOR_{result}$ xor $m_i$.

Hash outputs 1460 from a hashing component, such as hash outputs 1160a-n, is input into hash output manipulation block 1470. Each hash output 1460 is a different hash value computed by a separate hashing component for the hash key 1410. There may be any number of hash outputs 1460 that are input into the hash output manipulation block 1470, depending on the embodiment.

The addend value 1426 is inputted into addition function 1428, along with the hash output(s) 1460. The addition function 1428 performs an addition operation between each hash output 1460 and at least a portion of the addend value 1426 to produce a transformed hash output 1480.

In an embodiment with multiple hash outputs 1460, the entire addend 1426 may be added to each hash output 1460, to produce each separate transformed hash output 1480. In another embodiment with multiple hash outputs 1460, the addend is divided into a number z portions, equal in number to the number of hash outputs 1460. Each portion of the addend is the same size as a corresponding hash output 1460, to which it will be added to form the corresponding transformed hash output 1480. Hence, if each hash output 1460 is thirty-two bits, the addend may be divided into three portions, each thirty-two bits in size.

From a different perspective, the hash outputs 1460 may be concatenated together to form a single value, to which the entire addend 1426 is added. The output of the addition operation may then be separated again into each transformed hash output 1480.

In an embodiment, the addition of any distinct addend portion and hash output 1460 may be such that the operation does not impact any other hash output 1460. In this manner, the operation is said to be a modular addition operation. Other rules may also be imposed, such as a requirement that the result not saturate, and a requirement that the addition operation must simply roll over. In an embodiment where each addend element 1427 is a word, the addition operation is a word-wise addition operation.

System 1400 illustrates only one of many possible arrangements of components configured to transform a hash output 1460 into a transformed hash output 1480. Other arrangements may include fewer, additional, or different components, and the division of work between the components may vary depending on the arrangement.

1.12. Network Use Case

Figure 7:
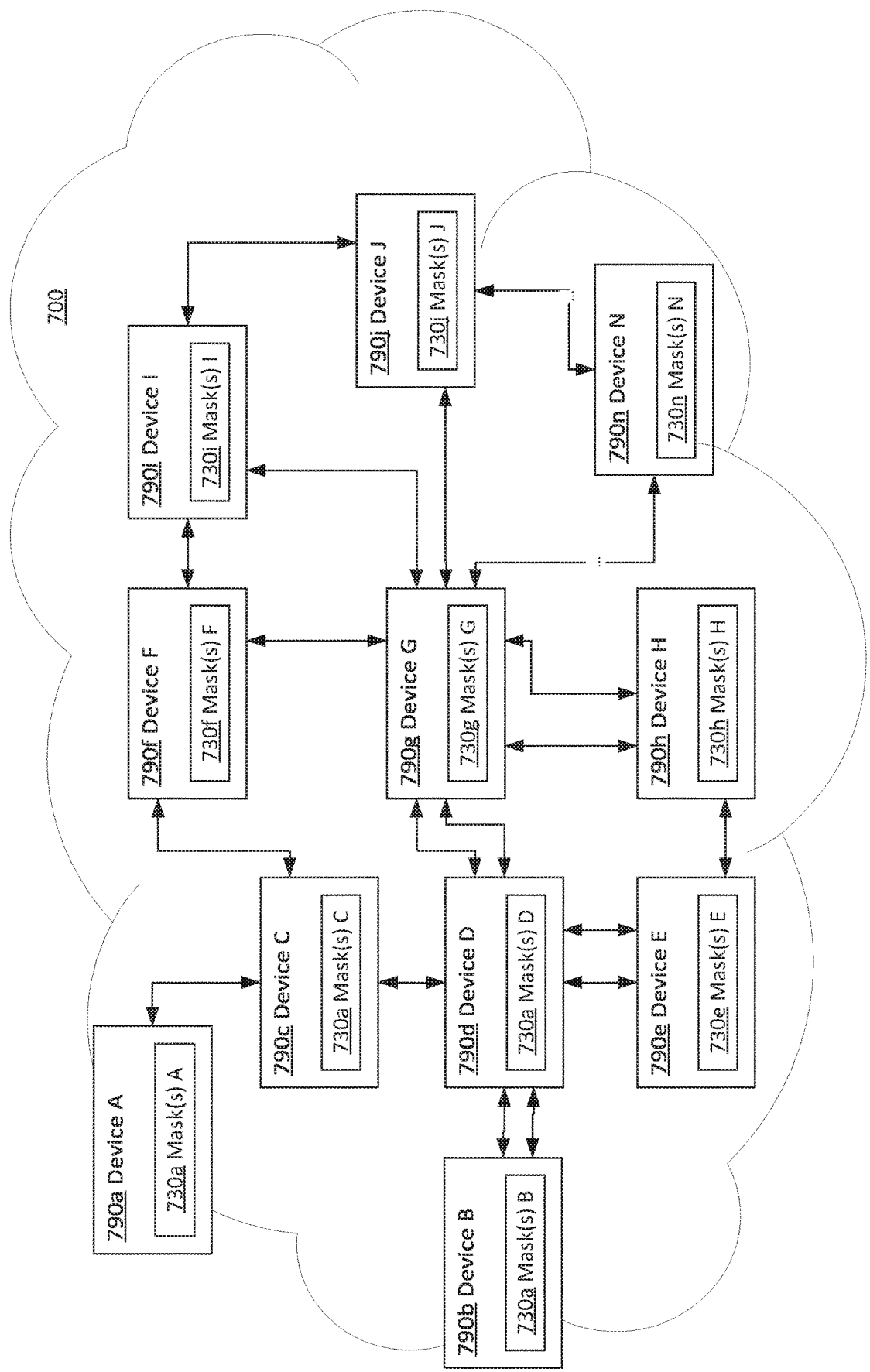
FIG. 7 illustrates a system of multiple interconnected network devices configured to utilize a same hashing function to perform a same networking function but with different input and/or output manipulations.

FIG. 7 illustrates a system 700 of multiple interconnected network devices 790a-n, collectively referred to as devices 790, configured to utilize a same hashing function to perform a same networking function, such as assigning traffic flows or paths, but with different input and/or output manipulations, according to an embodiment. For instance, each device may utilize a hash-based lookup operation for determining paths to assign to data packets. Although each device 790 comprises the same input and/or output manipulation logic, each device 790 is configured with a different set of one or more mask values 730 (e.g. input mask values, output mask values, extension values, etc.) to use when manipulating the inputs and/or outputs of the hashing function, thus resulting in each device utilizing a different strategy to transform a given input key and/or given output hash value. Thus, for example, each device may transform a given input key differently, resulting in each device potentially determining a different hash value for the given key, even though the same hashing function is utilized at each device. Or, as another example, each device may transform a given output hash value differently, resulting in each device utilizing a different index to locate information needed for operating decisions while performing the networking function, even though the same hashing function is utilized at each device. Consequently, a device 790 may treat data packets having the same key differently when performing the operation (e.g. make different data flow decisions).

1.13. Miscellaneous

According to an embodiment, a computing device may utilize hash-based operations for more than one function. For example, a network device may utilize hash-based lookup operations for more than one type of data. Hence, the device may include multiple hashing components, and multiple key transformation components. In an embodiment, some of all of these transformation components may utilize the same mask value in executing their respective transformation logic.

According to some embodiments, more than one hash function may be utilized to produce a single hash output. For example, one hash function may produce one portion of the hash output, while another hash function may produce another portion of the hash output. For instance, in an embodiment, three hash functions may be utilized to produce two hash outputs. There may be two CRC-16 functions (CRC16-CCITT and CRC16-SCSI) and one CRC-32 function (CRC-32C), where each hash function receives a unique transformed key such that two 16-bit hash outputs are produced and one 32-bit hash output is produced. The two 16-bit hash outputs may be combined to yield one 32-bit hash value and the other 32-bit hash output is provided directly.

Many of the techniques described herein are, for convenience, described with respect to data units referred to as data packets or network packets. However, it will be understood that the packets may be any unit of transmission over a network at any communication protocol layer, including IP packets, cells, frames, or other datagrams.

2.0. Functional Overview 2.1. Generating a Hash Value

Figure 8:
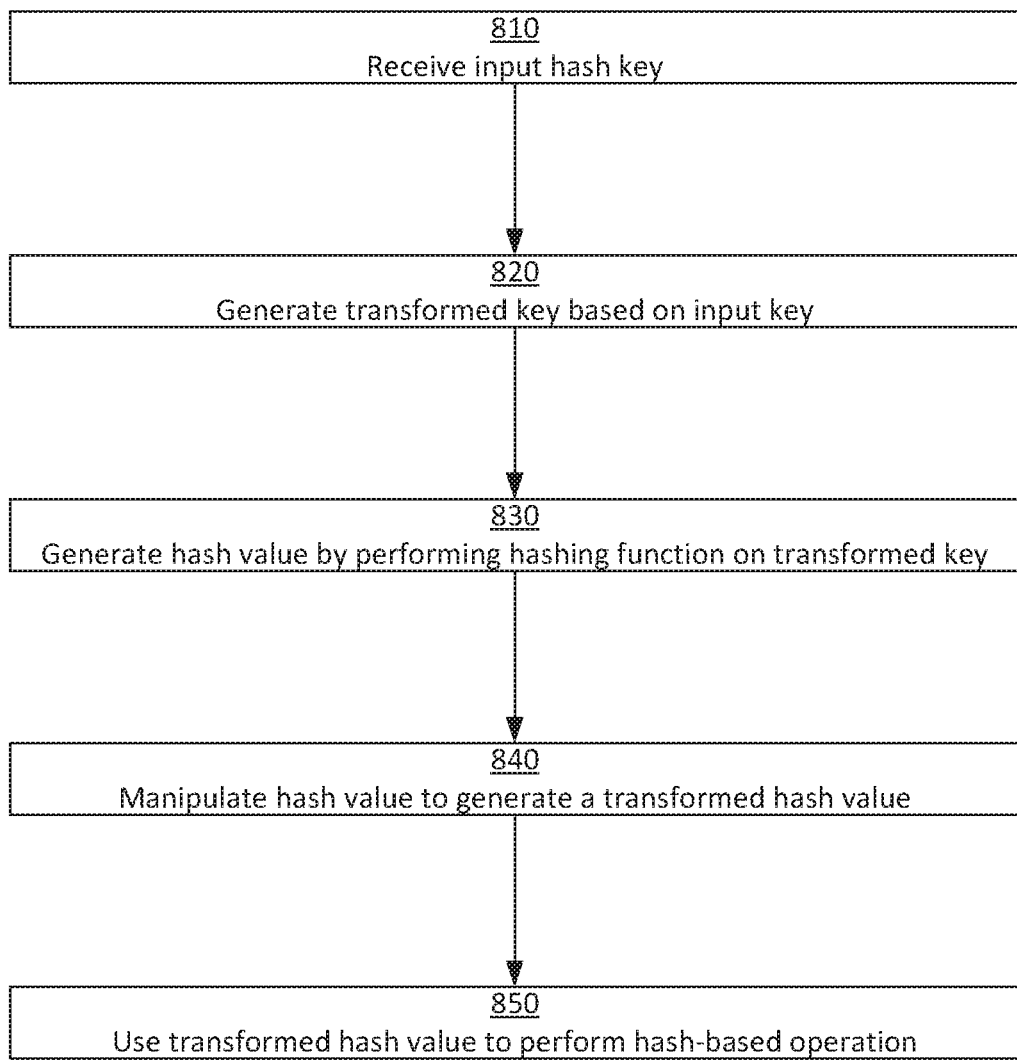
FIG. 8 illustrates an example flow for generating a hash value.

FIG. 8 illustrates an example flow 800 for generating a hash value, according to an embodiment. The various elements of flow 800 may be performed in a variety of systems, including systems such as systems 100, 200, 300, 400, and/or 500 described above. In an embodiment, each of the processes described in connection with the functional blocks described below may be implemented using one or more FPGAs, ASICs, computer programs, other software elements, and/or digital logic in any of a general-purpose computer or a special-purpose computer, while performing data retrieval, transformation, and storage operations that involve interacting with and transforming the physical state of memory of the computer.

Block 810 comprises receiving an input hash key, such as key 110. Block 820 comprises executing transformation logic based on the key and the mask value to generate a transformed key, such as transformed key 140. The transformation logic may be any suitable logic, including the example logic described elsewhere herein. The transformation logic may involve, for instance, extension logic using an extension value 1316, and/or logical operations with respect to an input mask value, such as predefined input mask value 130.

Block 830 comprises executing a hash function on the transformed key to generate a hash value, such as hash value 160. Again, any suitable hash function may be utilized, as described elsewhere herein.

Block 840 comprises manipulating the hash value, using hash output manipulation logic such as described elsewhere, to generate a transformed hash value. Block 840 may comprise, for instance, masking the hash value using an output mask value such as mask value 1130 and/or the key or a value derived therefrom.

Block 850 comprises performing a hash-based operation using the transformed hash value, such as the lookup operation described herein, or any other suitable hash-based operation.

Flow 800 illustrates only one of many possible flows for generating a hash value. Other flows may include fewer, additional, or different elements, in varying arrangements. For example, block 850 may be omitted, and the hash-based operation may be performed on the hash value directly. Or, block 820 may be omitted, and the hash function of block 830 may be performed on the input hash key directly.

2.2. Manipulating the Hash Key

Figure 9:
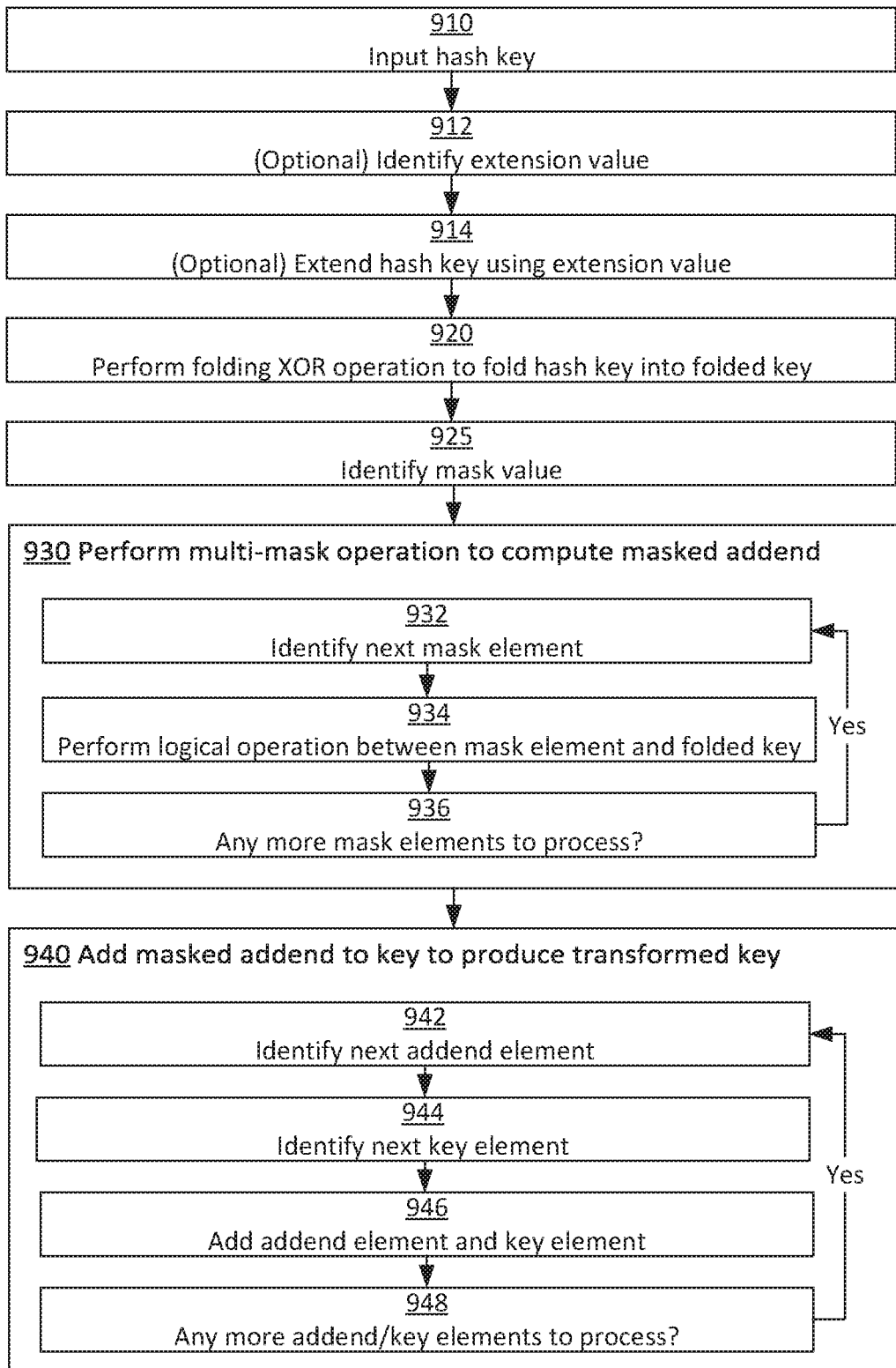
FIG. 9 illustrates an example flow for transforming a hash key.

FIG. 9 illustrates an example flow 900 for transforming a hash key, according to an embodiment. The various elements of flow 900 may be performed in a variety of systems, including systems such as system 600 described above. In an embodiment, each of the processes described in connection with the functional blocks described below may be implemented using one or more FPGAs, ASICs, computer programs, other software elements, and/or digital logic in any of a general-purpose computer or a special-purpose computer, while performing data retrieval, transformation, and storage operations that involve interacting with and transforming the physical state of memory of the computer.

Block 910 comprises inputting a hash key comprising multiple key elements, such as the key elements 611 of key 610.

Blocks 912 and 914, which are optional depending on the embodiment, comprise identifying an extension value, such as extension value 1318, and extending the hash key using the extension value, respectively. Block 912 may be a trivial read operation on a fixed register or other memory location, in the case that the same extension value is always used for any hash key processed by the device. Or, block 912 may comprise determining a suitable location from which to read the extension value, in embodiments where different extension values may be used to extend hash keys in different contexts (e.g. for lookups against different table). Such a determination may be made based on configuration data for the context (e.g. an identifier associated with the table).

Block 920 comprises performing a folding XOR operation, such as operation 622, to fold the key elements, including any added or modified through the optional extension in block 914, into a folded key.

Block 925 comprises identifying an input mask value, such as mask value 130. Block 925 may be a trivial read operation on a fixed register or other memory location, in the case that the same input mask value is always used for any hash key processed by the device. Or, block 925 may comprise determining a suitable location from which to read the mask value, in embodiments where different mask values may be used to mask hash keys in different contexts (e.g. for lookups against different table). Such a determination may be made based on configuration data for the context (e.g. an identifier associated with the table).

Block 930 comprises performing a multi-masking function, such as function 624, to compute a masked addend, such as addend 626. The multi-mask function comprises various substeps, repeated for each element of the identified mask value. At block 932, a next mask element is identified. Block 934 comprises performing a logical operation between the next mask element and the folded key to generate a next element of the masked addend. The logical operation may be, for instance, AND or XOR, depending on the embodiment. Block 936 comprises determining whether all of the mask elements have been processed. If not, flow returns to block 932. Otherwise, the multi-mask function is complete.

Block 940 comprises performing an addition operation, such as addition function 628, between the input key and the masked addend, to produce a transformed key, such as transformed key 640. The addition operation comprises various substeps, repeated for each element of a masked addend. At block 942, a next addend element is identified. At block 944, a next key element is identified.

Block 946 comprises performing an addition operation between the addend element and the key element to produce the next element of the transformed key. As explained elsewhere herein, the addition operation may be constrained in one or more aspects. For example, the addition operation may be a bytewise addition operation and/or not permitted to saturate or roll-over. In an embodiment, the addition operation may be defined on any suitable boundary, not just bytes. For example, the operation may be defined on two-byte units, four bit units, or even units of different sizes.

In an embodiment, the addition operation may involve multiple addends of potentially varying sizes. For example, an operation may involve first adding a first addend, addend_1, bytewise with the key elements that are also byte-wide elements. Then, or in parallel, the operation may add to the transformed key a second, two-byte addend, addend_2, to two bytes of the transformed key. This can be extended to any number of layers of addends.

Block 948 comprises determining whether all of the key elements have been processed. If not, flow returns to block 942. Otherwise, the addition operation is complete. The output of the addition operation is a transformed key ready for input into a hashing function.

Flow 900 illustrates only one of many possible flows for generating a hash value. Other flows may include fewer, additional, or different elements, in varying arrangements. For example, while certain blocks are depicted serially, it will be recognized that a number of blocks may be performed in parallel. For instance, each iteration of blocks 932-936 or blocks 942-948 may be performed in parallel with each other. Moreover, the order of certain depicted operations may vary.

2.3. Manipulating Hash Output

Figure 15:
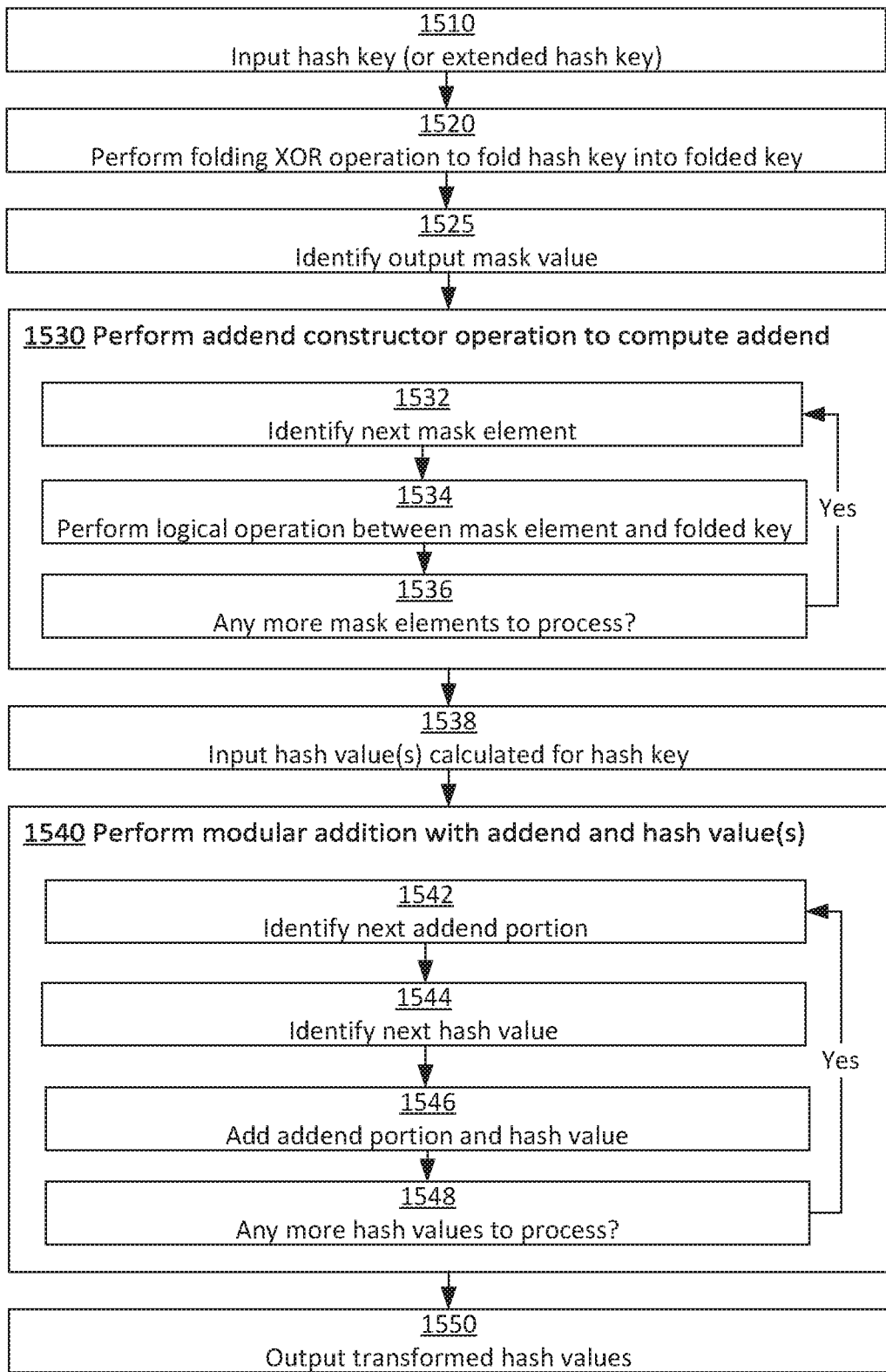
FIG. 15 illustrates an example flow for transforming one or more hash values.

FIG. 15 illustrates an example flow 1500 for transforming one or more hash values, according to an embodiment. The various elements of flow 1500 may be performed in a variety of systems, including systems such as system 600 described above. In an embodiment, each of the processes described in connection with the functional blocks described below may be implemented using one or more FPGAs, ASICs, computer programs, other software elements, and/or digital logic in any of a general-purpose computer or a special-purpose computer, while performing data retrieval, transformation, and storage operations that involve interacting with and transforming the physical state of memory of the computer.

Block 1510 comprises inputting a hash key comprising multiple key elements, such as the key elements 1411 of key 1410. The hash key may be an original hash key, or an extended hash key, depending on the embodiment. Block 1520 comprises performing a folding XOR operation, such as operation 1422, to fold the key elements into a folded key.

Block 1525 comprises identifying an output mask value, such as mask value 1130. Block 1525 may be a trivial read operation on a fixed register or other memory location, in the case that the same input mask value is always used for any hash key processed by the device. Or, block 1525 may comprise determining a suitable location from which to read the mask value, in embodiments where different mask values may be used to mask hash keys in different contexts (e.g. for lookups against different table). In an embodiment, such a determination may be made based on configuration data for the context (e.g. an identifier associated with the table). In an embodiment, the output mask value may be selected based on, for example, a given flow or set of flows maintained by a flow table or flow group table, an aggregation group, or any other identifying feature that remains fixed for packets of the same flow.

Block 1530 comprises performing an addend constructor operation, such as function 1424, to compute an addend, such as addend 1426. The addend constructor operation comprises various substeps, repeated for each element of the identified mask value. At block 1532, a next mask element is identified. Block 1534 comprises performing a logical operation between the next mask element and the folded key to generate a next element of the addend. The logical operation may be, for instance, AND or XOR, depending on the embodiment. Block 1536 comprises determining whether all of the mask elements have been processed. If not, flow returns to block 1532. Otherwise, the addend constructor operation is complete.

Block 1538 comprises receiving one or more hash values as input. The one or more hash values are hash values that have been calculated based on the key that was inputted in block 1510. The one or more hash values are different values. For instance, the one or more hash values may have been calculated using different hash functions.

Block 1540 comprises performing an addition operation, such as addition function 1428, between the one or more hash values and the addend, to produce a transformed hash value, such as transformed hash value 1180. The addition operation comprises various substeps, repeated for each of the hash values. At block 1542, a next addend portion is identified. Depending on the embodiment, the portion may be the entire addend, or a number of bits equal to the size of the next hash value to process, or other portions of the addend. At block 1544, a next hash value to transform is identified. Block 1546 comprises performing an addition operation between the addend element and the hash value to produce the next transformed hash value. As explained elsewhere herein, the addition operation may be constrained in one or more aspects. For example, the addition operation may be a modular addition operation and/or not permitted to saturate or roll-over. Again, the addition operation may be defined on boundaries of any suitable size, and/or involve multiple addends. Block 1548 comprises determining whether all of the hash values have been processed. If not, flow returns to block 1542. Otherwise, the addition operation is complete.

At block 1550, the result of the addition operation is outputted. The output of the addition operation is a set of one or more transformed hash values ready for input into a hash-based operation.

Flow 1500 illustrates only one of many possible flows for generating a hash value. Other flows may include fewer, additional, or different elements, in varying arrangements. For example, while certain blocks are depicted serially, it will be recognized that a number of blocks may be performed in parallel. For instance, each iteration of blocks 1532-1536 or blocks 1542-1548 may be performed in parallel with each other. Moreover, the order of certain depicted operations may vary.

2.4. Using Transformed Keys for Lookup Operations in a Network Device

Figure 10:
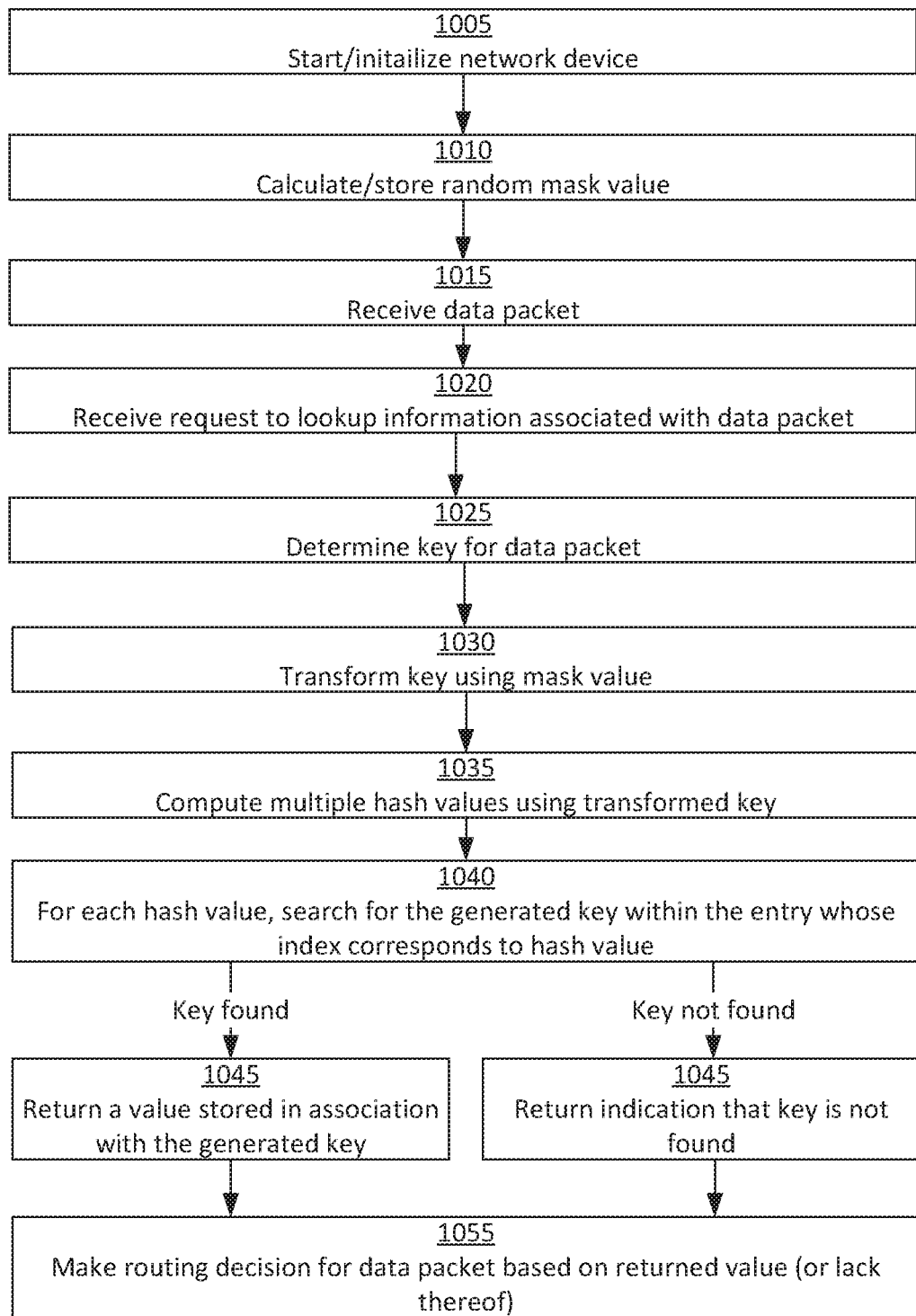
FIG. 10 illustrates an example flow for using transformed keys to support example lookup operations in a network device.

FIG. 10 illustrates an example flow 1000 for using transformed keys to support example lookup operations in a network device, according to an embodiment. The various elements of flow 1000 may be performed in a variety of systems, including systems such as described above. In an embodiment, each of the processes described in connection with the functional blocks described below may be implemented using one or more FPGAs, ASICs, computer programs, other software elements, and/or digital logic in any of a general-purpose computer or a special-purpose computer, while performing data retrieval, transformation, and storage operations that involve interacting with and transforming the physical state of memory of the computer.

Block 1005 comprises starting or initializing the network device. For example, the device may be powered on after being in a non-powered state, or an operating system of the device may be rebooted. Block 1010 comprises, during said starting or initializing, calculating and storing a random mask value for the device. This mask value may serve as a predefined mask value (e.g. mask value 130) for one or more key transformations within the device.

Block 1015 comprises receiving a data packet, such as an Ethernet packet, IP packet, or other datagram. For example, such a data packet may be received over a communication interface of the network device from another network device on the same network. The network device may be configured to route the data packet to yet another device on the network. Routing logic within the network device may be configured to utilize one or more hashing operations when determining where to send the data packet, when to send the data packet, whether to manipulate the data packet, or otherwise handle the data packet.

Block 1020 comprises receiving a request to lookup information associated with the data packet. Such lookup requests may occur in a variety of contexts, such as attempts to determine a flow or path to assign the data packet to. The information is information stored in an entry within one or more lookup tables, such as tables 270, configured to store a specific type of information, such as memory addresses, assigned traffic flows, or other suitable data.

Block 1025 comprises determining a key for the data packet. The key may be generated, for instance, by taking a first number of bits from the data packet, extracting data from specific locations within the packet header or payload, such as source and destination fields, applying some function to the packet, or any other suitable means.

Block 1030 comprises transforming the key using transformation logic based on the mask value, such as described elsewhere herein. Block 1035 comprises computing multiple hash values using the transformed key, by applying different hash functions to the transformed key. Block 1040 comprises, for each hash value, searching for the generated key within the table slot whose index corresponds to hash value. Block 1045 comprises, once the key is found, returning a value stored in association with the generated key. Alternatively, if the key is not found, block 1050 comprises returning data indicating that no value is stored for the key.

Block 1055 comprises making a routing decision for the data packet based on the returned value (or lack thereof).

Flow 1000 illustrates only one of many possible flows for using transformed keys to support lookup operations in a network device. Other flows may include fewer, additional, or different elements, in varying arrangements. For example, in an embodiment, instead of block 1050, flow 1000 may comprise steps such as, when the key is not found, calculating a value for the key and writing the key and the associated value at an index corresponding to one of the computed hash values. The calculated value may then be returned. Such steps may further comprise moving previously stored keys to other indexes corresponding to other hash values calculated for those keys in order to accommodate the newly written key, when needed.

2.5. Using Hash Manipulations for Mapping Functions

Figure 16:
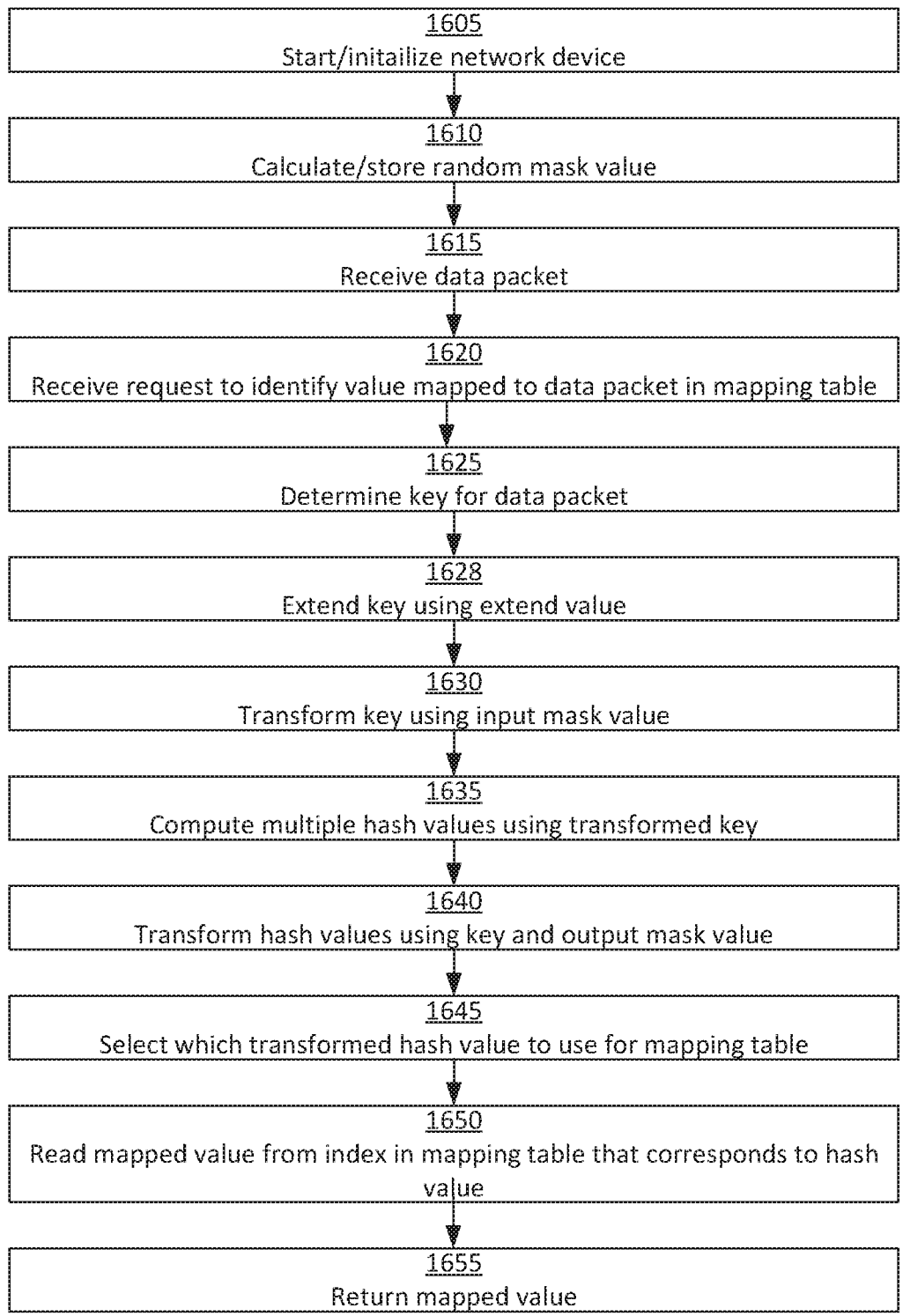
FIG. 16 illustrates an example flow for using transformed keys to support example mapping operations in a network device.
Figure 17:
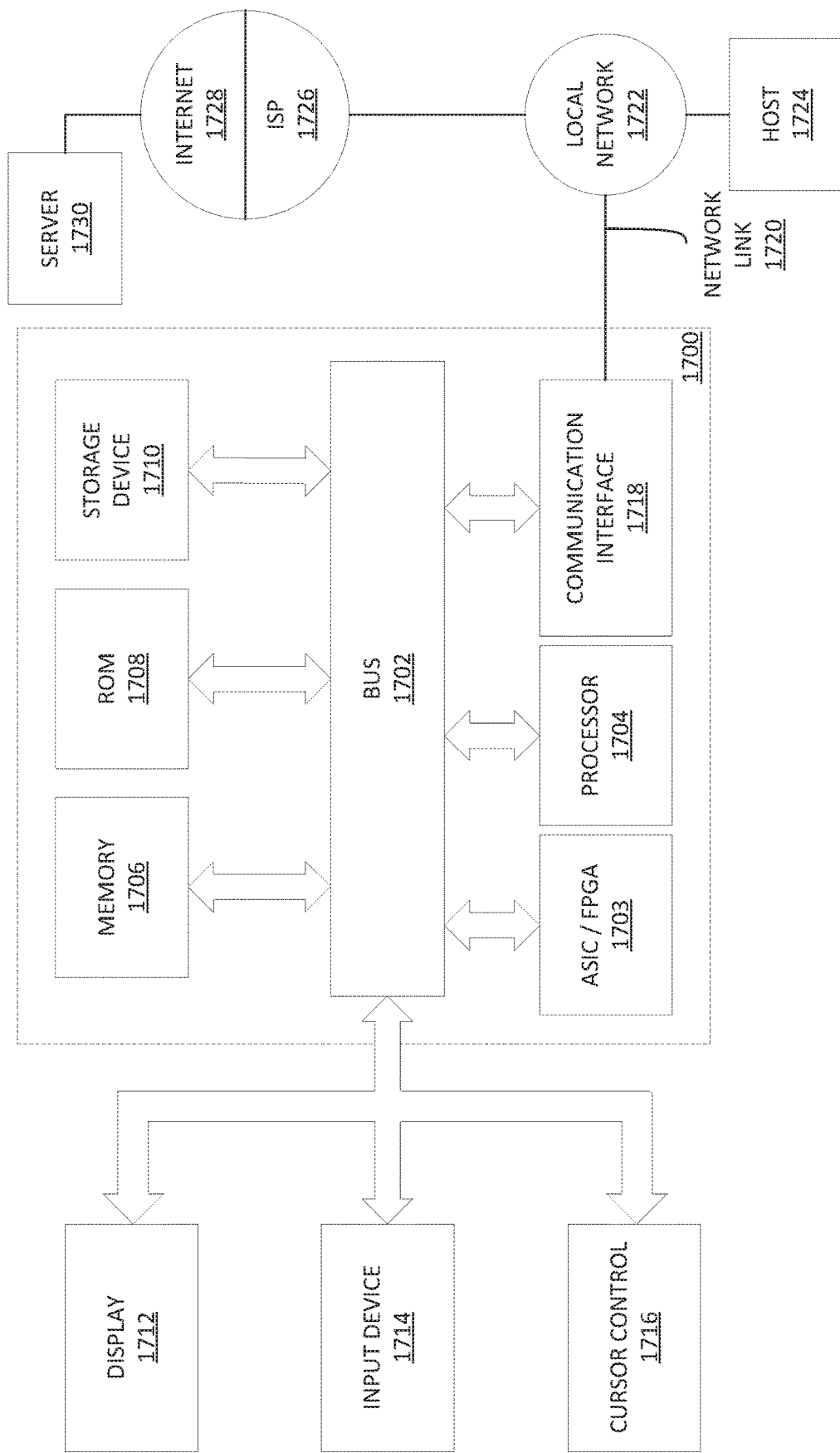
FIG. 17 is block diagram of a computer system upon which embodiments of the inventive subject matter may be implemented.

FIG. 16 illustrates an example flow 1600 for using transformed keys to support example mapping operations in a network device, according to an embodiment. The various elements of flow 1600 may be performed in a variety of systems, including systems such as described above. In an embodiment, each of the processes described in connection with the functional blocks described below may be implemented using one or more FPGAs, ASICs, computer programs, other software elements, and/or digital logic in any of a general-purpose computer or a special-purpose computer, while performing data retrieval, transformation, and storage operations that involve interacting with and transforming the physical state of memory of the computer.

Blocks 1605-1625 proceed as with blocks 1005-1025, except that the request of block 1620 is to identify a value mapped to the data packet in a specific mapping table (e.g. in a table of assigned paths or traffic flows).

Block 1628 comprises extending the key using an extension value, as described in other sections.

Block 1630 comprises transforming the extended key using an input mask value, as described in other sections. Block 1635 comprises computing multiple hash values using the transformed key. For example, in an embodiment, three different outputs are generated using three different hashing functions.

Block 1640 comprises transforming the generated hash values using the key, extended key, or transformed key along with an output mask value. Examples of logic for transforming the generated hash values are described in other sections.

Block 1645 comprises selecting which of the multiple transformed hash values to use for the mapping table, typically using configuration data associated with the mapping table. Generally, the same transformed hash output should be selected whenever mapping values from the mapping table.

Block 1650 comprises reading a mapped value from the mapping table, at an index indicated by the hash value. The index may be equal to the transformed hash value itself, or, if the transformed hash value is greater than the number of buckets within the mapping table, the index may be the remainder produced by a modulo operation dividing the transformed hash value by the number of buckets.

Block 1655 comprises returning the mapped value.

Flow 1600 illustrates only one of many possible flows for using transformed keys to support mapping operations in a network device. Other flows may include fewer, additional, or different elements, in varying arrangements. For example, in an embodiment, instead of storing an actual mapping table, the mappings may be represented by other suitable data structures. For example, a data structure may map ranges of index values to mapped values, and the mapping may comprise determining which range includes the determined index.

3.0. Example Embodiments

Examples of some embodiments are represented, without limitation, in the following clauses:

According to an embodiment, an apparatus comprises a transformation component, configured to input a hash key, generate a transformed hash key based on the inputted hash key, and output the transformed hash key; and a hashing component, configured to input the transformed hash key, generate a hash value based on applying a hash function to the transformed hash key, and output the hash value.

According to an embodiment, an apparatus comprises a hashing component, configured to input a hash key, generate a hash value based on applying a hash function to the transformed hash key, and output the hash value; and a hash value output manipulation component, configured to input a hash value, generate a transformed hash value based on the inputted hash value, and output the transformed hash value.

According to an embodiment, an apparatus comprises: key generation logic configured to identify keys for data units; a hash block configured to input the keys and output indexes, the hash block further configured to, for a given key of the keys, determine one or more of the indexes that hash to the given key using one or more hashing functions applied to one or more transformed keys generated from the given key and one or more selected pre-defined mask values; one or more lookup components configured to search for values associated with the keys in different sets of one or more lookup tables, the one or more lookup components searching for a given key in a given set of one or more lookup tables at one or more of the indexes outputted by the hash block for the given key.

According to an embodiment, an apparatus comprises: key generation logic configured to identify keys for data units; a hash block configured to input the keys and output indexes, the hash block further configured to, for a given key of the keys, determine one or more of the indexes that hash to the given key using: one or more hashing functions applied to the key or one or more key values derived from the given key, and hash value manipulation logic that applies a selected pre-defined output mask value to one or more hash values output by the one or more hashing functions; one or more mapping components configured to search for values that map to the keys in mapping tables, the one or more mapping components locating the value mapped to a given key in a given mapping table at one or more of the indexes outputted by the hash block for the given key.

According to an embodiment, an apparatus comprises: a transformation component, configured to input a hash key comprising one or more key elements, generate a transformed hash key based on a series of logical operations involving the one or more key elements of the inputted hash key and a fixed mask value comprising a corresponding one or more mask elements, and output the transformed hash key; a hashing component, configured to input the transformed hash key, generate a hash value based on applying a hash function to the transformed hash key, and output the hash value.

In an embodiment, the one or more key elements include two or more key elements. In an embodiment, the one or more key elements are each of the same length as a corresponding mask element of the one or more mask elements. In an embodiment, each of the one or more key elements is of an equal length. In an embodiment, each of the one or more key elements is a byte. In an embodiment, wherein the hash key is different than the transformed hash key, and the fixed mask value is different than the hash key and the transformed hash key.

In an embodiment, the transformation component and the hashing component are implemented by one or more FPGAs or ASICs.

In an embodiment, the series of logical operations includes an addition operation between the hash key and an addend determined based on the fixed mask value. In an embodiment, the series of logical operations includes an XOR-folding operation between each of the one or more key elements to produce a folded key value, AND or XOR operations between the folded key value and each mask element of the one or more mask elements to produce a masked addend, and an addition operation between the masked addend and the hash key to produce the transformed hash key.

In an embodiment, an apparatus further comprises: a mask value determination component, configured to initialize the fixed mask value upon a restart operation of the apparatus. In an embodiment, the mask value determination component is configured to initialize the fixed mask value to a random value upon the restart operation. In an embodiment, the fixed mask value does not change between system restart operations.

In an embodiment, the hash function is a cyclic redundancy check (CRC) function.

In an embodiment, an apparatus further comprises: one or more lookup tables comprising entries that store values associated with transformed hash keys; a lookup component configured to use the hash value generated by the hashing component to identify an index of an entry in the one or more lookup tables in which a value associated with the hash key is stored.

In an embodiment, the hash key is derived from a data packet and the value is a memory address in which information related to the data packet is stored. In an embodiment, the information related to the data packet is an assigned path or flow. In an embodiment, the information related to the data packet is used for packet forwarding actions, including one or more of: signature identification, counter identification, path resolution, group classification, security, or editing.

In an embodiment, an apparatus further comprises: a key generation component configured to input a data packet, generate the hash key based on the data packet, and output the hash key. In an embodiment, the key generation component is configured to generate the hash key by using one or more fields of the inputted data packet as the one or more hash key elements. In an embodiment, the one or more fields include one or more of: a destination field, a source field, a protocol field, a destination port field, or a source port field.

In an embodiment, an apparatus further comprises: an extension component configured to prepend and/or append one or more fixed extension values to the hash key prior to the hash key being inputted to the transformation component.

In an embodiment, the hashing component is a first hashing component of multiple hashing components configured to input the transformed hash key, each of the multiple hashing components configured to output a different hash value generated based upon the transformed hash key, using a different hash function of the transformed hash key.

In an embodiment, the transformation component is a first transformation component of multiple transformation components configured to input the hash key, each of the multiple transformation components configured to generate a different transformed hash key based upon the hash key, using a different fixed mask value.

In an embodiment, the hashing component is a first hashing component of multiple hashing components, each of the multiple hashing components configured to input a different one of the different transformed hash keys and output a different hash value generated based upon the respectively inputted transformed hash key.

In an embodiment, the hashing component is a first hashing component of multiple hashing components, including a second hashing component configured to output another hash value generated based on applying a hash function to the hash key.

In an embodiment, an apparatus further comprises: a lookup component configured to utilize each of the different hash values outputted by the multiple hashing components as indexes in one or more lookup tables, the lookup component searching for an entry associated with the hash key at each of the indexes.

In an embodiment, the lookup component is configured to, if no entry associated with the hash key is found at any of the indexes, add an entry associated with the hash key at one of the indexes. In an embodiment, the lookup component is configured to, if no entry associated with the transformed hash key is found at any of the indexes, and the lookup table is full at each of the indexes, move an entry associated with an other hash key from a particular one of the indexes to another index to which one of the multiple hashing components hashes an other transformed hash key generated by the transformation component for the other hash key, and add an entry associated with the hash key at the particular one of the indexes.

In an embodiment, an apparatus further comprises a plurality of sets of lookup tables, each set of lookup tables having configuration data indicating one or more of: which of the different outputted hash values the lookup component is to utilize as the index when searching in the set of lookup tables, how many buckets are in the set of lookup tables, or the mask value to use to compute the transformed hash key when searching in the set of lookup tables.

In an embodiment, an apparatus further comprises a plurality of sets of lookup tables, each set of lookup tables having configuration data indicating one or more of: which hash function is to be applied to generate the hash value when searching in the set of lookup tables, or a manner by which the hash value is to be manipulated.

In an embodiment, an apparatus further comprises a plurality of lookup components, each lookup component configured to utilize at least one of the different hash values generated by the multiple hashing components as an index in a lookup table corresponding to the lookup component, each lookup component having configuration data indicating which of the different outputted hash values the lookup component is to utilize as the index.

In an embodiment, an apparatus is a network device configured to switch or route Ethernet or Internet Protocol (IP) packets, the network device further comprising: a key generation component configured to generate hash keys to input into the transformation component based on the packets; a lookup component configured to locate information associated with the packets using hash values generated by the hashing component; packet handling logic configured to determine how to handle the packets based on the information located by the lookup component.

According to an embodiment, a system comprises: at least a plurality of network devices interconnected by one or more networks, each device in the plurality comprising: one or more network interfaces configured to receive and send messages to other devices over the one or more networks; key generation logic configured to generate hash keys based on the messages; a transformation component, configured to input hash keys, generate transformed hash keys based on the inputted hash keys, and to output the transformed hash keys; a hashing component, configured to input the transformed hash keys, generate hash values based on applying a hash function to the transformed hash key, and output the hash values; and message handling logic configured to handle the messages based on the hash values; wherein the transformation component on each device is configured to apply a different transformation to the hash keys used to generate the hash values for the message handling logic at the device than applied at each other of the devices in the plurality.

In an embodiment, the transformation component at each device is configured to utilize a mask value to transform the hash keys generated at the device, each device utilizing a different mask value to transform the hash keys used to generate the hash values for the message handling logic at the device.

In an embodiment, the transformation component transforms hash keys by, for each given hash key of the hash keys, generating an folded key using XOR operations between each of one or more key elements within the given hash key, generating a masked addend using AND or XOR operations between the folded key and each mask element of one or more mask elements in a fixed mask value associated with the transformation component, generating a given transformed hash key using an addition operation between the masked addend and the given hash key.

In an embodiment, the different mask value of each device is randomly assigned when the device is booted.

In an embodiment, the messages are IP packets or Ethernet packets, wherein the hash keys are predefined locations within the IP packets or Ethernet packets. In an embodiment, the predefined locations include one or more of a source address field, source port field, destination address field, destination source field, or protocol type field.

According to an embodiment, an apparatus comprises: a key generation configured to generate a hash key from a data unit; a key extension component configured to extend the hash key by prepending or appending a predefined extension value to the hash key; a key transformation component configured to transform the extended hash key based on an input mask value; a hashing component configured to generate one or more hash values by performing one or more hash functions on the transformed extended hash key; a hash value manipulation component configured to transform the one or more hash values based on an output mask value and at least one of the extended hash key or the transformed extended hash key; a hash-based operation component configured to perform a hash-based operation with respect to the data unit based on information stored at a location whose address is determined using a particular transformed hash value generated by the hash value manipulation component.

In an embodiment, the data unit is a network packet being routed through the apparatus, wherein the hash-based operation includes identifying a path or flow to assign to the network packet in a mapping table, the assigned path or flow stored at an entry within the mapping table whose index corresponds to the particular transformed hash value.

In an embodiment, the key generation component is configured to generate the hash key by extracting at least one or more of a source address, destination address, source port, destination port, or protocol of the network packet.

In an embodiment, the hashing component is configured to generate two or more hash values based on the transformed extended hash key, the hash value manipulation component is configured to transform the two or more hash values, and the hash-based operation component is configured to select which of the two or more hash values to input as the particular transformed hash value based on configuration data associated with a mapping table from which the information is retrieved.

In an embodiment, the extension value, input mask value, and output mask value are generated at least partially randomly whenever the apparatus boots or restarts.

In an embodiment, an apparatus further comprises logic configured to determine where to read the extension value, input mask value, and output mask value from based on configuration data associated with a mapping table from which the information is retrieved and/or a group to which the data unit is assigned.

In an embodiment, the hash value manipulation component is configured to transform the hash value by generating a first folded key value from the extended hash key, the first folded key value generated by dividing the inputted extended hash key into a plurality of first key portions and performing a first logical operation between each of the first key portions, generating an output addend based on second logical operations between the first folded key and each of two or more mask elements of the output mask value, and generating a transformed hash value based on a first addition operation between at least a portion of the output addend and the hash value.

In an embodiment, the hashing component is configured to generate two or more hash values based on the transformed extended hash key, and the hash value manipulation component is configured to transform the two or more hash values by adding each of two or more distinct sub-elements of the output addend to a corresponding one of the two or more hash values.

In an embodiment, the hash-based operation component is configured to determine which of the multiple transformed hash values to input based upon configuration data associated with a table for the hash-based operation component is instructed to use an output of the hash output manipulation component as an index during the hash-based operation.

In an embodiment, the extended hash key is dividable into a plurality of second key portions, and the key transformation component is configured to: perform a third logical operation between each of the second key portions to produce a second folded key value, generate a input addend based on fourth logical operations between the second folded key and each of two or more mask elements of the input mask value, and generate the transformed extended hash key based on a second addition operation between the input addend and the extended hash key.

In an embodiment, the first logical operation and the third logical operation are both an XOR-folding operation, the second logical operations and the fourth logical operations are each an AND or an XOR operation, and the first addition operation and second addition operation are modular addition operations.

In an embodiment, the second key portions are bytes and the first key portions are words.

In an embodiment, the one or more hashing functions include at least one hardware-implemented cyclic-redundancy-check (CRC) based function.

In an embodiment, the key generation, key extension component, key transformation component, hashing component, and hash value manipulation component are implemented by one or more FPGAs or ASICs.

According to an embodiment, a system comprises: at least a plurality of network devices interconnected by one or more networks, each device in the plurality comprising: one or more network interfaces configured to receive and send messages to other devices over the one or more networks;

key generation logic configured to generate hash keys based on the messages; a hashing component, configured to generate hash values based on applying a hash function to either the hash keys or manipulated hash keys derived from the hash keys, and to output the hash values; a hash value manipulation component configured to input the hash values, generate transformed hash values based on the hash values, and output the transformed hash values; and message handling logic configured to handle the messages based on the transformed hash values; wherein the hash value manipulation component on each device is configured to apply a different transformation to the hash values for the message handling logic at the device than applied at each other of the devices in the plurality.

In an embodiment, the hash value manipulation component at each device is configured to utilize a mask value to transform the hash values generated at the device, each device utilizing a different mask value to transform the hash values for the message handling logic at the device.

In an embodiment, the transformation component transforms hash values by, for each given hash key of the hash keys: generating an folded key using XOR operations between each of two or more key elements within the given hash key, generating a masked addend using AND or XOR operations between the folded key and each mask element of two or more mask elements in a fixed mask value associated with the hash value manipulation component, and generating a given transformed hash value using an addition operation between at least a portion the masked addend and a given hash value computed for the given hash key.

In an embodiment, the different mask value of each device is randomly assigned when the device is booted.

In an embodiment, the messages are IP or Ethernet packets, wherein the hash keys are extracted from predefined locations within the packets. In an embodiment, the predefined fields include two or more of a source address field, source port field, destination address field, destination source field, or protocol type field.

In an embodiment, each device further comprises a hash key manipulation component, configured to input hash keys, extend the hash keys, generate transformed extended hash keys based on the inputted hash keys, and to output the transformed extended hash keys as manipulated hash keys for input into the hashing component.

According to an embodiment, an apparatus comprises: a hashing component, configured to input a key value derived from a hash key, generate a hash value based on applying a hash function to the input, and output the hash value; a hash output manipulation component, configured to input the hash key and the hash value from the hashing component, generate a transformed hash value based upon the inputted hash key, a fixed mask value, and the hash value, and output the transformed hash value.

In an embodiment, the hash output manipulation component and the hashing component are implemented by one or more FPGAs or ASICs.

In an embodiment, the hash value is different than the transformed hash value, the hash key is different than the hash value and the transformed hash value, and the fixed mask value is different than the hash key, hash value, and the transformed hash value.

In an embodiment, the hash value manipulation component is configured to generate the transformed hash value by generating an addend using the inputted hash key and a fixed mask value, and generate a transformed hash value based on an operation between the addend and the hash value.

In an embodiment, the hashing component is configured to generate multiple hash values for the hash key using multiple different hash functions, wherein the hash output manipulation component is configured to input the multiple hash values, wherein the operation between the addend and the transformed hash value comprises adding different distinct addend sub-elements to different hash values of the multiple hash values to generate multiple transformed hash values, the hash output manipulation component configured to output the multiple transformed hash values.

In an embodiment, the hashing component is configured to generate multiple hash values for the hash key using multiple different hash functions, wherein the hash output manipulation component is configured to input the multiple hash values, wherein the hash output manipulation component configured to generate multiple transformed hash values based on the multiple different hash functions, the fixed mask value, and the hash key, wherein the hash output manipulation component is further configured to output the multiple transformed hash values. The apparatus further comprises: a hash-based operation component configured to input a particular hash value and perform a hash-based operation based on the inputted particular hash-based operation, wherein the hash-based operation component is configured to determine which of the multiple hash values to input from the hash output manipulation component.

In an embodiment, the hash-based operation component is configured to determine which of the multiple transformed hash values to input based upon configuration data associated with a table for the hash-based operation component is instructed to use an output of the hash output manipulation component as an index during the hash-based operation.

In an embodiment, the hash-based operation component is configured to determine which hash function is to be applied to generate the hash value, or a manner by which the hash value is to be manipulated, based upon configuration data associated with a table for the hash-based operation component is instructed to use an output of the hash output manipulation component as an index during the hash-based operation.

In an embodiment, the hash-based operation component is configured to determine which of the multiple transformed hash values to input based upon configuration data associated a characteristic of a data unit for which the hash key was generated, the hash-based operation being performed with respect to the data unit.

In an embodiment, an apparatus further comprises a key transformation component configured to input the hash value, generate the key value based on transforming the hash value, and output the key value to the hashing component.

In an embodiment, the hash key is an extended hash key, and the apparatus further comprises: a key extension component configured to input an original key, extend the original key by prepending or appending a fixed extension value to the original key, and output the hash key.

In an embodiment, the hash value manipulation component is configured to generate the transformed hash value by generating a folded key by performing a first logical operation between each of two or more key elements of the inputted hash key, generating an addend based on second logical operations between the folded key and each of two or more mask elements of a fixed mask value, and generating a transformed hash value based on an operation between at least a portion of the addend and the hash value.

In an embodiment, the two or more key elements and two or more mask elements are each of the same length. In an embodiment, each of the two or more key elements and two or more mask elements are sixteen bits in length. In an embodiment, the operation between the addend and the hash value is an addition operation. In an embodiment, the first logical operation is an XOR-folding operation, the second logical operations are each an AND or an XOR operation.

In an embodiment, an apparatus further comprises a mask value determination component, configured to initialize the fixed mask value upon a restart operation of the apparatus.

In an embodiment, the mask value determination component is configured to initialize the fixed mask value to a random value upon the restart operation. In an embodiment, the fixed mask value does not change between system restart operations.

In an embodiment, the hash function is a cyclic redundancy check (CRC) function.

In an embodiment, an apparatus further comprises one or more mapping tables comprising entries that store values associated with transformed hash keys;

a mapping component configured to use the transformed hash value generated by the hashing component to identify an index of an entry in the one or more lookup tables in which a value associated with the hash key is stored.

In an embodiment, the hash key is derived from a data packet and the value is a memory address in which information related to the data packet is stored. In an embodiment, the information related to the data packet is an assigned path or flow. In an embodiment, the information related to the data packet is used for packet forwarding actions, including one or more of: signature identification, counter identification, path resolution, group classification, security, or editing.

In an embodiment, an apparatus further comprises a key generation component configured to input a data packet, generate the hash key based on the data packet, and output the hash key.

In an embodiment, the key generation component is configured to generate the hash key by using two or more fields of the inputted data packet as the two or more hash key elements. In an embodiment, the two or more fields include two or more of: a destination field, a source field, a protocol field, a destination port field, or a source port field.

In an embodiment, an apparatus further comprises a manipulation component configured to manipulate the hash key prior to the hash key being inputted to the hashing component, the manipulating including one or more of prepending and/or appending one or more fixed extension values to the hash key, or performing a series of logical operations based on the hash key.

In an embodiment, the hashing component outputs a plurality of different hash values generated based upon the hash key, using a different hash function.

In an embodiment, the apparatus is a network device configured to switch or route Ethernet or Internet Protocol (IP) packets, the network device further comprising: a key generation component configured to generate hash keys to input into the transformation component based on the packets; a mapping component configured to locate information associated with the packets using hash values generated by the hashing component; packet handling logic configured to determine how to handle the packets based on the information located by the mapping component.

According to an embodiment, a system comprises: at least a plurality of network devices interconnected by one or more networks, each device in the plurality comprising: one or more network interfaces configured to receive and send messages to other devices over the one or more networks; key generation logic configured to generate hash keys based on the messages; a hashing component, configured to input the hash keys, generate hash values based on applying a hash function to the hash key, and output the hash values; and a transformation component, configured to input hash values, generate transformed hash values based on the inputted hash values, and to output the transformed hash values; message handling logic configured to handle the messages based on the transformed hash values; wherein the transformation component on each device is configured to apply a different transformation to the hash values used to generate the hash values for the message handling logic at the device than applied at each other of the devices in the plurality.

In an embodiment, the transformation component at each device is configured to utilize a mask value to transform the hash keys generated at the device, each device utilizing a different mask value to transform the hash keys used to generate the hash values for the message handling logic at the device.

In an embodiment, the different mask value of each device is randomly assigned when the device is booted.

In an embodiment, the messages are IP packets or Ethernet packets, wherein the hash keys are predefined locations within the IP packets or Ethernet packets.

According to an embodiment, a method comprises: receiving input identifying a hash key comprising one or more key elements; generating a transformed hash key based on a series of logical operations involving the one or more key elements of the inputted hash key and a fixed mask value comprising a corresponding one or more mask elements; generating a hash value based on applying a hash function to the transformed hash key; performing a lookup operation for information associated with the hash key using the generated hash value.

According to an embodiment, a method comprises: generating a hash key from a data unit; extending the hash key by prepending or appending a predefined extension value to the hash key; transforming the extended hash key based on an input mask value; generating one or more hash values by performing one or more hash functions on the transformed extended hash key; transforming the one or more hash values based on an output mask value and at least one of the extended hash key or the transformed extended hash key; performing a hash-based operation with respect to the data unit based on information stored at a location whose address is determined using a particular transformed hash value generated by the hash value manipulation component.

According to an embodiment, a method comprises: inputting a key value derived from a hash key; generating a hash value based on applying a hash function to the inputted key value; generating a transformed hash value based upon the inputted hash key, a fixed mask value, and the hash value; searching for information mapped to the hash key using the transformed hash value.

Other examples of these and other embodiments are found throughout this disclosure.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

FIG. 11 is a block diagram that illustrates a computer system 1100 that may be utilized in implementing the above-described techniques, according to an embodiment. Computer system 1100 may be, for example, a desktop computing device, laptop computing device, tablet, smartphone, server appliance, computing mainframe, multimedia device, handheld device, networking apparatus, or any other suitable device.

Computer system 1100 may include one or more ASICs, FPGAs, or other specialized circuitry 1103 for implementing program logic as described herein. For example, circuitry 1103 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1100 may include one or more hardware processors 1104 configured to execute software-based instructions. Computer system 1100 may also include one or more busses 1102 or other communication mechanism for communicating information. Busses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes one or more memories 1106, such as a RAM, hardware registers, or other dynamic or volatile storage device for storing data units to be processed by the one or more ASICs, FPGAs, or other specialized circuitry 1103. Memory 1106 may also or instead be used for storing information and instructions to be executed by processor 1104. Memory 1106 may be directly connected or embedded within circuitry 1103 or a processor 1104. Or, memory 1106 may be coupled to and accessed via bus 1102. Memory 1106 also may be used for storing temporary variables, data units describing rules or policies, or other intermediate information during execution of program logic or instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, may optionally be provided and coupled to bus 1102 for storing information and instructions.

A computer system 1100 may also include, in an embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As yet another example, the one or more communication interfaces 1118 may include a wireless network interface controller, such as a 1102.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a Service Provider 1126. Service Provider 1126, which may for example be an Internet Service Provider (ISP), in turn provides data communication services through a wide area network, such as the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In an embodiment, computer system 1100 can send messages and receive data through the network(s), network link 1120, and communication interface 1118. In some embodiments, this data may be data units that the computer system 1100 has been asked to process and, if necessary, redirect to other computer systems via a suitable network link 1120. In other embodiments, this data may be instructions for implementing various processes related to the described techniques. For instance, in the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

Computer system 1100 may optionally be coupled via bus 1102 to one or more displays 1112 for presenting information to a computer user. For instance, computer system 1100 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1112.

One or more input devices 1114 are optionally coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In an embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

As discussed, computer system 1100 may implement techniques described herein using customized hard-wired logic, one or more ASICs or FPGAs 1103, firmware and/or program logic, which in combination with the computer system causes or programs computer system 1100 to be a special-purpose machine. According to one embodiment, however, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   key generation logic, implemented at least partially in hardware, configured to generate a key using information extracted from a data unit;
   a hash block, implemented at least partially in hardware, configured to receive the key from the key generation logic as input and output two or more indexes determined based upon the key, the hash block including:
transformation logic configured to transform the key into one or more transformed keys; and
one or more hash function blocks configured to calculate one or more hash values by executing one or more hash functions on the one or more transformed keys, the two or more indexes being derived from the one or more hash values, a different technique is used to derive each of the two or more indexes;
one or more lookup components, implemented at least partially in hardware, configured to search for one or more values associated with the data unit in one or more lookup tables, stored in one or more memory devices, at one or more particular indexes of the two or more indexes, the one or more values instruct the apparatus on how to handle the data unit.

2. The apparatus of claim 1, wherein the hash block further comprises a hash output manipulation block configured to transform the one or more hash values into the two or more indexes using hash output manipulation logic.

3. The apparatus of claim 2, wherein the hash output manipulation logic includes one or more of: a shift operation, a transpose operation, or a mask operation that uses a predefined output mask value.

4. The apparatus of claim 1, wherein the transformation logic includes one or more of: a shift operation, a transpose operation, an extension operation, or a mask operation that uses a predefined input mask value, wherein the two or more indexes are two or more hash values.

5. The apparatus of claim 1,
wherein the hash block is configured to determine multiple indexes that map to the key and output the multiple indexes;
wherein the one or more lookup components are configured to search for the one or more values at each of the multiple indexes outputted by the hash block.

6. The apparatus of claim 1,
wherein the hash block is configured to determine multiple indexes that map to the key and output the multiple indexes;
wherein the one or more lookup components includes a first lookup component configured to select a first index of the multiple indexes at which to search a first table for a first value mapped to the data unit.

7. The apparatus of claim 1, wherein the apparatus is a networking switching apparatus configured to forward the data unit to one or more devices on the network, wherein the one or more lookup tables are one or more weighted cost multipathing tables, and wherein the one or more values are a path to assign to the data unit.

8. The apparatus of claim 1, wherein the one or more hash functions include a cyclic redundancy check (CRC) function.

9. A method comprising:
generating a key using information extracted from a data unit;
performing one or more operations on the key to transform the key into one or more transformed keys;
calculating one or more hash values by executing one or more hash functions on the one or more transformed keys;
deriving two or more indexes from the one or more hash values, a different technique is used to derive each of the two or more indexes;
searching for one or more values associated with the data unit in one or more lookup tables, stored in one or more memory devices, at one or more particular indexes of the two or more indexes;
handling the data unit based on the one or more values.

10. The method of claim 9, further comprising transforming the one or more hash values into the two or more indexes using hash output manipulation logic.

11. The method of claim 10, wherein the hash output manipulation logic includes one or more of: a shift operation, a transpose operation, or a mask operation that uses a predefined output mask value.

12. The method of claim 9, wherein performing one or more operations comprises performing one or more of: a shift operation, a transpose operation, an extension operation, or a mask operation that uses a predefined input mask value, wherein the two or more indexes are two or more hash values.

13. The method of claim 9, wherein the two or more indexes include multiple indexes that map to the key, wherein the searching comprises searching for the one or more values at each of the multiple indexes.

14. The method of claim 9, wherein the two or more indexes include multiple indexes that map to the key, the method further comprising selecting a first index of the multiple indexes at which to search a first table for a first value mapped to the data unit.

15. One or more non-transitory computer-readable media storing instructions that, when executed by one or more computing devices, cause:
generating a key using information extracted from a data unit;
performing one or more operations on the key to transform the key into one or more transformed keys;
calculating one or more hash values by executing one or more hash functions on the one or more transformed keys;
deriving two or more indexes from the one or more hash values, a different technique is used to derive each of the two or more indexes;
searching for one or more values associated with the data unit in one or more lookup tables, stored in one or more memory devices, at one or more particular indexes of the two or more indexes;
handling the data unit based on the one or more values.

16. The one or more non-transitory computer-readable media of claim 15, further comprising transforming the one or more hash values into the two or more indexes using hash output manipulation logic.

17. The one or more non-transitory computer-readable media of claim 16, wherein the hash output manipulation logic includes one or more of: a shift operation, a transpose operation, or a mask operation that uses a predefined output mask value.

18. The one or more non-transitory computer-readable media of claim 15, wherein performing one or more operations comprises performing one or more of: a shift operation, a transpose operation, an extension operation, or a mask operation that uses a predefined input mask value, wherein the two or more indexes are the one or more hash values.

19. The one or more non-transitory computer-readable media of claim 15, wherein the two or more indexes include multiple indexes that map to the key, wherein the searching comprises searching for the one or more values at each of the multiple indexes.

20. The one or more non-transitory computer-readable media of claim 15, wherein the two or more indexes include multiple indexes that map to the key, the method further comprising selecting a first index of the multiple indexes at which to search a first table for a first value mapped to the data unit.

\* \* \* \* \*